US011641627B2

(12) United States Patent
Ryu et al.

(10) Patent No.: US 11,641,627 B2
(45) Date of Patent: May 2, 2023

(54) POWER CONTROL INDICATION IN GROUPCAST SIDELINK COMMUNICATIONS

(71) Applicant: QUALCOMM incorporated, San Diego, CA (US)

(72) Inventors: Jung Ho Ryu, Fort Lee, NJ (US); Kapil Gulati, Hillsborough, NJ (US); Junyi Li, Chester, NJ (US); Sony Akkarakaran, Poway, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/944,113

(22) Filed: Jul. 30, 2020

(65) Prior Publication Data
US 2021/0037476 A1 Feb. 4, 2021

Related U.S. Application Data

(60) Provisional application No. 62/882,422, filed on Aug. 2, 2019.

(51) Int. Cl.
*H04W 52/14* (2009.01)
*H04W 52/24* (2009.01)
(Continued)

(52) U.S. Cl.
CPC ........... *H04W 52/14* (2013.01); *H04W 4/70* (2018.02); *H04W 52/10* (2013.01);
(Continued)

(58) Field of Classification Search
CPC ..... H04W 52/14; H04W 52/245; H04W 4/70; H04W 52/10; H04W 52/367; H04W 92/18
See application file for complete search history.

(56) References Cited

U.S. PATENT DOCUMENTS 6,959,199 B2 * 10/2005 Ohkubo .............. H04W 52/327
455/522
2001/0046877 A1 * 11/2001 Ohkubo .............. H04W 52/327
455/522
(Continued)

FOREIGN PATENT DOCUMENTS

CN 109392069 A 2/2019
EP 2413645 A2 2/2012
(Continued)

OTHER PUBLICATIONS

International Search Report and Written Opinion—PCT/US2020/044589—ISA/EPO—dated Oct. 29, 2020 (194171 WO).
(Continued)

*Primary Examiner* — Brenda H Pham
(74) *Attorney, Agent, or Firm* — Holland & Hart LLP/Qualcomm Incorporated

(57) ABSTRACT

Methods, systems, and devices for user equipment (UE) device-to-device sidelink wireless communications with transmit power adjustments provided through transmit power control requests. A group of UEs may use sidelink groupcast transmissions for communications, and a sidelink groupcast transmitter may increase or decrease transmission power of the groupcast transmissions for more efficient and reliable transmissions. Each UE that receives groupcast transmissions from the sidelink groupcast transmitter may have a different set of wireless resources that may be used to transmit a transmit power control indication to request higher or lower transmit power at the transmitting UE. Alternatively, wireless resources for providing the transmit power indications may be separately provided for TPC-UP indications and for TPC-DOWN indications.

28 Claims, 22 Drawing Sheets

(51) Int. Cl.
  *H04W 4/70* (2018.01)
  *H04W 52/10* (2009.01)
  *H04W 52/36* (2009.01)
  *H04W 92/18* (2009.01)

(52) U.S. Cl.
  CPC ....... *H04W 52/245* (2013.01); *H04W 52/367* (2013.01); *H04W 92/18* (2013.01)

(56) References Cited

U.S. PATENT DOCUMENTS

| | | | | |
|---|---|---|---|---|
| 2003/0045317 | A1* | 3/2003 | Pan | H04W 76/45 |
| | | | | 455/518 |
| 2010/0265990 | A1* | 10/2010 | Birru | H04W 8/005 |
| | | | | 375/130 |
| 2014/0094213 | A1* | 4/2014 | Khoshnevis | H04W 52/00 |
| | | | | 455/522 |
| 2016/0150484 | A1* | 5/2016 | Seo | H04W 52/322 |
| | | | | 455/522 |
| 2016/0227463 | A1* | 8/2016 | Baligh | H04W 40/16 |
| 2017/0150302 | A1* | 5/2017 | Sorrentino | H04L 12/189 |
| 2019/0141640 | A1 | 5/2019 | Abedini et al. | |
| 2019/0208476 | A1* | 7/2019 | Wu | H04W 52/383 |

FOREIGN PATENT DOCUMENTS

| | | | |
|---|---|---|---|
| EP | 3244665 A1 | 11/2017 | |
| WO | WO-2018135905 A1 * | 7/2018 | ............. H04L 5/001 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 15)", V15.6.0, Jun. 2019, 545 Pages.

* cited by examiner

POWER CONTROL INDICATION IN GROUPCAST SIDELINK COMMUNICATIONS

CROSS REFERENCE

The present application for patent claims the benefit of U.S. Provisional Patent Application No. 62/882,422 by RYU et al., entitled "POWER CONTROL INDICATION IN GROUPCAST SIDELINK COMMUNICATIONS," filed Aug. 2, 2019, which is assigned to the assignee hereof and expressly incorporated by reference herein.

BACKGROUND

The following relates generally to wireless communications, and more specifically to power control indication in groupcast sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs or may support communications between multiple base stations. In some examples, a sidelink may be referred to as a PC5 interface (e.g., supporting vehicle-to-everything (V2X) and/or vehicle-to-vehicle (V2V) communications between vehicles in a system). In some cases, a sidelink may be referred to as a device-to-device (D2D) link and may support unicast messaging, groupcast messaging, multicast messaging, broadcast messaging, or combinations thereof. With the addition of one or more communications links at a wireless device, link management at a device may become challenging. Accordingly, efficient techniques for link management of sidelink communication links may be desirable.

SUMMARY

The described techniques relate to improved methods, systems, devices, and apparatuses that support power control indication in groupcast sidelink communications. According to various aspects of the disclosure, techniques provide for a sidelink transmitting user equipment (UE) to receive transmit power control indications from one or more other sidelink UEs that receive transmissions from the sidelink transmitting UE. The transmit power control indications may provide the sidelink transmitting UE with feedback information that can be used to determine if a transmit power of the transmissions should be adjusted. Based on the transmit power control indications, the sidelink transmitting UE, in some cases, may increase or decrease transmission power of the transmissions for more efficient and reliable transmissions.

In some cases, each UE of a set of UEs that receive transmissions from the sidelink transmitting UE may have a different set of wireless resources that may be used to transmit the transmit power control indication to the sidelink transmitting UE. Such different sets of resources may provide for relatively reliable communication of transmit power control indications. In some cases, the wireless resources for transmit power control indications may be allocated by a base station that serves the sidelink UEs, and may be provided to one or more of the sidelink UEs by the base station. In some cases, one or more UEs that receive the sidelink transmissions may be out of coverage of the base station, and may receive the wireless resources for the transmit power control indications from one or more other UEs, such as the sidelink transmitting UE.

Additionally or alternatively, a first set of wireless resources may be allocated for indications to increase transmission power at the sidelink transmitting UE and a second set of wireless resources may be allocated for indications to decrease transmission power at the sidelink transmitting UE. Such separate sets of wireless resources may provide reduced interference for UEs requesting increases in transmission power through separation from requests for decreased transmission power (i.e., from UEs that are likely closer to the sidelink transmitting UE and thus have higher power signals at the sidelink transmitting UE). The sidelink transmitting UE may adjust a transmission power of the sidelink transmissions based on the received transmit power control indications (e.g., based on a majority rule or a number of UEs that request an increase in transmission power).

In some cases, a UE that receives the sidelink transmissions may provide transmit power control indications based on its proximity to the sidelink transmitting UE. In such cases, if a UE is within a distance threshold of the sidelink transmitting UE, the UE may provide transmit power control indications to the sidelink transmitting UE, and if a UE is outside of the distance threshold such indications may be discontinued. In such cases, a UE that discontinues providing transmit power control indications may opportunistically monitor for the transmissions. If such a UE then moves back within the distance threshold, transmit power control indications may be resumed. In some cases, a UE may discontinue providing transmit power control indications if the UE determines that its transmit power requests are not impacting the transmission power of the transmissions (e.g., based on detecting a same or increased power after a transmit power indication that requests reduced power). Additionally or alternatively, UEs that provide transmit power control indications may use a preconfigured transmission power to transmit the power control indications, may use an open loop power control technique to determine the transmission power at which to transmit the power control indications, or combinations thereof.

A method of wireless communication at a first UE is described. The method may include identifying a first set of wireless resources for transmission of a first transmit power control indication from the first UE to a transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the transmitter, determining the first transmit power control indication based on a measured signal strength of the device-to-device sidelink communication from the transmitter, and transmitting the first transmit power control indication to the transmitter via the first set of wireless resources.

An apparatus for wireless communication at a first UE is described. The apparatus may include a processor, memory coupled with the processor, and instructions stored in the memory. The instructions may be executable by the processor to cause the apparatus to identify a first set of wireless resources for transmission of a first transmit power control indication from the first UE to a transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the transmitter, determine the first transmit power control indication based on a measured signal strength of the device-to-device sidelink communication from the transmitter, and transmit the first transmit power control indication to the transmitter via the first set of wireless resources.

Another apparatus for wireless communication at a first UE is described. The apparatus may include means for identifying a first set of wireless resources for transmission of a first transmit power control indication from the first UE to a transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the transmitter, determining the first transmit power control indication based on a measured signal strength of the device-to-device sidelink communication from the transmitter, and transmitting the first transmit power control indication to the transmitter via the first set of wireless resources.

A non-transitory computer-readable medium storing code for wireless communication at a first UE is described. The code may include instructions executable by a processor to identify a first set of wireless resources for transmission of a first transmit power control indication from the first UE to a transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the transmitter, determine the first transmit power control indication based on a measured signal strength of the device-to-device sidelink communication from the transmitter, and transmit the first transmit power control indication to the transmitter via the first set of wireless resources.

In some examples of the method, apparatuses, and non-transitory computer-readable medium described herein, the identifying may include operations, features, means, or instructions for receiving an indication of the first set of wireless resources from one or more of a base station that serves the transmitter and the first UE, the transmitter, another UE of the group of UEs, or any combinations thereof. Some examples of the method, apparatuses, and non-transitory computer-readable medium described herein may further include operations, features, means, or instructions for determining, prior to identifying the first set of wireless resources, to subscribe to groupcast transmissions of the transmitter, and where the identifying the first set of wireless resources may be performed responsive to subscribing to the groupcast transmissions of the transmitter. In some examples of the method, apparatuses, and non-transitory computer-readable medium described herein, the determining the first transmit power control indication may be performed responsive to a physical sidelink shared channel (PSSCH) transmission of the transmitter.

Some examples of the method, apparatuses, and non-transitory computer-readable medium described herein may further include operations, features, means, or instructions for determining a distance between the transmitter and the first UE, and discontinuing the determining and the transmitting of the first transmit power control indication based on the distance exceeding a threshold distance value. Some examples of the method, apparatuses, and non-transitory computer-readable medium described herein may further include operations, features, means, or instructions for opportunistically monitoring, after the discontinuing, for transmissions of the transmitter. Some examples of the method, apparatuses, and non-transitory computer-readable medium described herein may further include operations, features, means, or instructions for determining, after the discontinuing, that the distance between the transmitter and the first UE is less than the threshold distance value, and resuming the determining and the transmitting of the first transmit power control indication based on the distance being less than the threshold distance value.

In some examples of the method, apparatuses, and non-transitory computer-readable medium described herein, the first set of wireless resources is associated with a first beam of a set of beams used by the transmitter for communications. In some examples of the method, apparatuses, and non-transitory computer-readable medium described herein, the transmitter communicates using an omnidirectional beam, and where the first set of wireless resources include a first set of time resources, a first set of frequency resources, or combinations thereof.

Some examples of the method, apparatuses, and non-transitory computer-readable medium described herein may further include operations, features, means, or instructions for determining that one or more other UEs of the group of UEs is causing transmit power adjustments of the transmitter, and discontinuing the transmitting of the first transmit power control indication based on the determining that one or more other UEs of the group of UEs is causing transmit power adjustments of the transmitter. In some examples of the method, apparatuses, and non-transitory computer-readable medium described herein, the determining that one or more other UEs of the group of UEs is causing transmit power adjustments of the transmitter may include operations, features, means, or instructions for transmitting one or more power down indications to the transmitter, and determining that the transmitter has maintained or increased transmission power after the one or more power down indications.

Some examples of the method, apparatuses, and non-transitory computer-readable medium described herein may further include operations, features, means, or instructions for setting a transmit power of the first transmit power control indication at a maximum transmission power of the first UE based on the first transmit power control indication requesting a higher transmit power at the transmitter. Some examples of the method, apparatuses, and non-transitory computer-readable medium described herein may further include operations, features, means, or instructions for determining that a lower transmit power at the transmitter is to be requested by the first UE, and setting a transmit power of the first transmit power control indication according to an open loop power control procedure or according to a preconfigured transmit power responsive to the determining that the lower transmit power is requested.

A method of wireless communication at a first UE is described. The method may include identifying a first set of wireless resources for indicating a power-up transmit power control request to a transmitter of a device-to-device sidelink communication, and a second set of wireless resources for indicating a power-down transmit power control request to the transmitter, where the first set of wireless resources is different than the second set of wireless resources, determining which of the power-up transmit power control request or the power-down transmit power control request is to be indicated to the transmitter based on a measured signal strength of the device-to-device sidelink communication from the transmitter, selecting which of the first set of wireless resources or the second set of wireless resources is to be used to transmit a first transmit power control indication based on the determining, and transmitting the first transmit power control indication to the transmitter via the selected set of wireless resources.

An apparatus for wireless communication at a first UE is described. The apparatus may include a processor, memory coupled with the processor, and instructions stored in the memory. The instructions may be executable by the processor to cause the apparatus to identify a first set of wireless resources for indicating a power-up transmit power control request to a transmitter of a device-to-device sidelink communication, and a second set of wireless resources for indicating a power-down transmit power control request to the transmitter, where the first set of wireless resources is different than the second set of wireless resources, determine which of the power-up transmit power control request or the power-down transmit power control request is to be indicated to the transmitter based on a measured signal strength of the device-to-device sidelink communication from the transmitter, select which of the first set of wireless resources or the second set of wireless resources is to be used to transmit a first transmit power control indication based on the determining, and transmit the first transmit power control indication to the transmitter via the selected set of wireless resources.

Another apparatus for wireless communication at a first UE is described. The apparatus may include means for identifying a first set of wireless resources for indicating a power-up transmit power control request to a transmitter of a device-to-device sidelink communication, and a second set of wireless resources for indicating a power-down transmit power control request to the transmitter, where the first set of wireless resources is different than the second set of wireless resources, determining which of the power-up transmit power control request or the power-down transmit power control request is to be indicated to the transmitter based on a measured signal strength of the device-to-device sidelink communication from the transmitter, selecting which of the first set of wireless resources or the second set of wireless resources is to be used to transmit a first transmit power control indication based on the determining, and transmitting the first transmit power control indication to the transmitter via the selected set of wireless resources.

A non-transitory computer-readable medium storing code for wireless communication at a first UE is described. The code may include instructions executable by a processor to identify a first set of wireless resources for indicating a power-up transmit power control request to a transmitter of a device-to-device sidelink communication, and a second set of wireless resources for indicating a power-down transmit power control request to the transmitter, where the first set of wireless resources is different than the second set of wireless resources, determine which of the power-up transmit power control request or the power-down transmit power control request is to be indicated to the transmitter based on a measured signal strength of the device-to-device sidelink communication from the transmitter, select which of the first set of wireless resources or the second set of wireless resources is to be used to transmit a first transmit power control indication based on the determining, and transmit the first transmit power control indication to the transmitter via the selected set of wireless resources.

In some examples of the method, apparatuses, and non-transitory computer-readable medium described herein, the identifying may include operations, features, means, or instructions for receiving an indication of the first set of wireless resources and the second set of wireless resources from one or more of a base station that serves the transmitter and the first UE, the transmitter, another UE of a group of UEs that receives the device-to-device sidelink communication from the transmitter, or any combinations thereof. Some examples of the method, apparatuses, and non-transitory computer-readable medium described herein may further include operations, features, means, or instructions for determining, prior to identifying the first set of wireless resources, to subscribe to groupcast transmissions of the transmitter, and where the identifying the first set of wireless resources and the second set of wireless resources is performed responsive to subscribing to the groupcast transmissions of the transmitter.

Some examples of the method, apparatuses, and non-transitory computer-readable medium described herein may further include operations, features, means, or instructions for determining a distance between the transmitter and the first UE, and discontinuing the determining and the transmitting of the first transmit power control indication based on the distance exceeding a threshold distance value.

Some examples of the method, apparatuses, and non-transitory computer-readable medium described herein may further include operations, features, means, or instructions for determining that one or more other UEs of a group of UEs that receive communications from the transmitter is causing transmit power adjustments of the transmitter, and discontinuing the transmitting of the first transmit power control indication based on the determining that one or more other UEs of the group of UEs is causing transmit power adjustments of the transmitter.

Some examples of the method, apparatuses, and non-transitory computer-readable medium described herein may further include operations, features, means, or instructions for setting a transmit power of the first transmit power control indication based on which of the first set of wireless resources or the second set of wireless resources is selected.

A method of wireless communication at a transmitting UE is described. The method may include identifying a plurality of different sets of wireless resources for providing transmit power control indications from a group of receiving UEs to the transmitting UE, each set of wireless resources associated with a different receiving UE of the group of receiving UEs that receive device-to-device sidelink transmissions of the transmitting UE, monitoring the plurality of different sets of wireless resources for one or more transmit power control indications from one or more of the group of receiving UEs, determining a transmission power adjustment for the transmissions based on the one or more transmit power control indications, and transmitting the transmissions at a transmission power that is based on the transmission power adjustment.

An apparatus for wireless communication at a transmitting UE is described. The apparatus may include a processor, memory coupled with the processor, and instructions stored in the memory. The instructions may be executable by the processor to cause the apparatus to identify a plurality of different sets of wireless resources for providing transmit power control indications from a group of receiving UEs to the transmitting UE, each set of wireless resources associated with a different receiving UE of the group of receiving UEs that receive device-to-device sidelink transmissions of the transmitting UE, monitor the plurality of different sets of wireless resources for one or more transmit power control indications from one or more of the group of receiving UEs, determine a transmission power adjustment for the transmissions based on the one or more transmit power control indications, and transmit the transmissions at a transmission power that is based on the transmission power adjustment.

Another apparatus for wireless communication at a transmitting UE is described. The apparatus may include means for identifying a plurality of different sets of wireless resources for providing transmit power control indications from a group of receiving UEs to the transmitting UE, each set of wireless resources associated with a different receiving UE of the group of receiving UEs that receive device-to-device sidelink transmissions of the transmitting UE, monitoring the plurality of different sets of wireless resources for one or more transmit power control indications from one or more of the group of receiving UEs, determining a transmission power adjustment for the transmissions based on the one or more transmit power control indications, and transmitting the transmissions at a transmission power that is based on the transmission power adjustment.

A non-transitory computer-readable medium storing code for wireless communication at a transmitting UE is described. The code may include instructions executable by a processor to identify a plurality of different sets of wireless resources for providing transmit power control indications from a group of receiving UEs to the transmitting UE, each set of wireless resources associated with a different receiving UE of the group of receiving UEs that receive device-to-device sidelink transmissions of the transmitting UE, monitor the plurality of different sets of wireless resources for one or more transmit power control indications from one or more of the group of receiving UEs, determine a transmission power adjustment for the transmissions based on the one or more transmit power control indications, and transmit the transmissions at a transmission power that is based on the transmission power adjustment.

In some examples of the method, apparatuses, and non-transitory computer-readable medium described herein, the identifying may include operations, features, means, or instructions for receiving an indication of the plurality of different sets of wireless resources from one or more of a base station that serves the transmitting UE, another UE of the group of UEs, or any combinations thereof. In some examples of the method, apparatuses, and non-transitory computer-readable medium described herein, the transmit power control indications may be provided responsive to a physical sidelink shared channel (PSSCH) transmission of the transmitting UE.

In some examples of the method, apparatuses, and non-transitory computer-readable medium described herein, the determining the transmission power adjustment may include operations, features, means, or instructions for determining to reduce the transmission power of the transmissions based on receiving more power control down indications than power control up indications, and determining to increase the transmission power of the transmissions based on receiving more power control up indications than power control down indications. In some examples of the method, apparatuses, and non-transitory computer-readable medium described herein, the determining the transmission power adjustment may include operations, features, means, or instructions for determining to reduce the transmission power of the transmissions based on receiving one or more transmission power control down indications in the one or more transmit power control indications in an absence of any transmission power control up indications, and determining to increase the transmission power of the transmissions based on receiving at least one transmission power control up indication in the one or more transmit power control indications. In some examples of the method, apparatuses, and non-transitory computer-readable medium described herein, the transmissions are transmitted using an omnidirectional beam, and where the plurality of different sets of wireless resources include different sets of time resources, frequency resources, or combinations thereof.

In some examples of the method, apparatuses, and non-transitory computer-readable medium described herein, the determining the transmission power adjustment may include operations, features, means, or instructions for determining to reduce the transmission power a first beam used for the transmissions based on receiving one or more transmission power control down indications in the one or more transmit power control indications associated with the first beam in an absence of any transmission power control up indications associated with the first beam, and determining to increase the transmission power of the first beam used for the transmissions based on receiving at least one transmission power control up indication associated with the first beam.

A method of wireless communication at a transmitting UE is described. The method may include identifying a first set of wireless resources for receiving one or more power-up transmit power control requests from one or more receiving UEs that receive device-to-device sidelink transmissions of the transmitting UE, and a second set of wireless resources for receiving one or more power-down transmit power control requests from the one or more receiving UEs, where the first set of wireless resources is different than the second set of wireless resources, monitoring the first set of wireless resources and the second set of wireless resources for one or more transmit power control indications from the one or more receiving UEs, determining a transmission power adjustment for the transmissions based on the one or more transmit power control indications, and transmitting the transmissions at a transmission power that is based on the transmission power adjustment.

An apparatus for wireless communication at a transmitting UE is described. The apparatus may include a processor, memory coupled with the processor, and instructions stored in the memory. The instructions may be executable by the processor to cause the apparatus to identify a first set of wireless resources for receiving one or more power-up transmit power control requests from one or more receiving UEs that receive device-to-device sidelink transmissions of the transmitting UE, and a second set of wireless resources for receiving one or more power-down transmit power control requests from the one or more receiving UEs, where the first set of wireless resources is different than the second set of wireless resources, monitor the first set of wireless resources and the second set of wireless resources for one or more transmit power control indications from the one or more receiving UEs, determine a transmission power adjustment for the transmissions based on the one or more transmit power control indications, and transmit the transmissions at a transmission power that is based on the transmission power adjustment.

Another apparatus for wireless communication at a transmitting UE is described. The apparatus may include means for identifying a first set of wireless resources for receiving one or more power-up transmit power control requests from one or more receiving UEs that receive device-to-device sidelink transmissions of the transmitting UE, and a second set of wireless resources for receiving one or more power-down transmit power control requests from the one or more receiving UEs, where the first set of wireless resources is different than the second set of wireless resources, monitoring the first set of wireless resources and the second set of wireless resources for one or more transmit power control indications from the one or more receiving UEs, determining a transmission power adjustment for the transmissions based on the one or more transmit power control indications, and transmitting the transmissions at a transmission power that is based on the transmission power adjustment.

A non-transitory computer-readable medium storing code for wireless communication at a transmitting UE is described. The code may include instructions executable by a processor to identify a first set of wireless resources for receiving one or more power-up transmit power control requests from one or more receiving UEs that receive device-to-device sidelink transmissions of the transmitting UE, and a second set of wireless resources for receiving one or more power-down transmit power control requests from the one or more receiving UEs, where the first set of wireless resources is different than the second set of wireless resources, monitor the first set of wireless resources and the second set of wireless resources for one or more transmit power control indications from the one or more receiving UEs, determine a transmission power adjustment for the transmissions based on the one or more transmit power control indications, and transmit the transmissions at a transmission power that is based on the transmission power adjustment.

In some examples of the method, apparatuses, and non-transitory computer-readable medium described herein, the identifying may include operations, features, means, or instructions for receiving an indication of the first set of wireless resources and the second set of wireless resources from one or more of a base station that serves the transmitting UE, another UE, or any combinations thereof. In some examples of the method, apparatuses, and non-transitory computer-readable medium described herein, the transmit power control indications may be provided responsive to a physical sidelink shared channel (PSSCH) transmission of the transmitting UE.

In some examples of the method, apparatuses, and non-transitory computer-readable medium described herein, the determining the transmission power adjustment may include operations, features, means, or instructions for determining to reduce the transmission power of the transmissions based on receiving one or more transmission power control down indications in an absence of any transmission power control up indications, and determining to increase the transmission power of the transmissions based on receiving at least one transmission power control up indication. In some examples of the method, apparatuses, and non-transitory computer-readable medium described herein, the transmissions are transmitted using an omnidirectional beam, and where the first set of wireless resources and the second set of wireless resources include different sets of time resources, frequency resources, or combinations thereof. In some examples of the method, apparatuses, and non-transitory computer-readable medium described herein, the first set of wireless resources and the second set of wireless resources are identified for each beam used for the transmissions.

DETAILED DESCRIPTION

Figure 1:
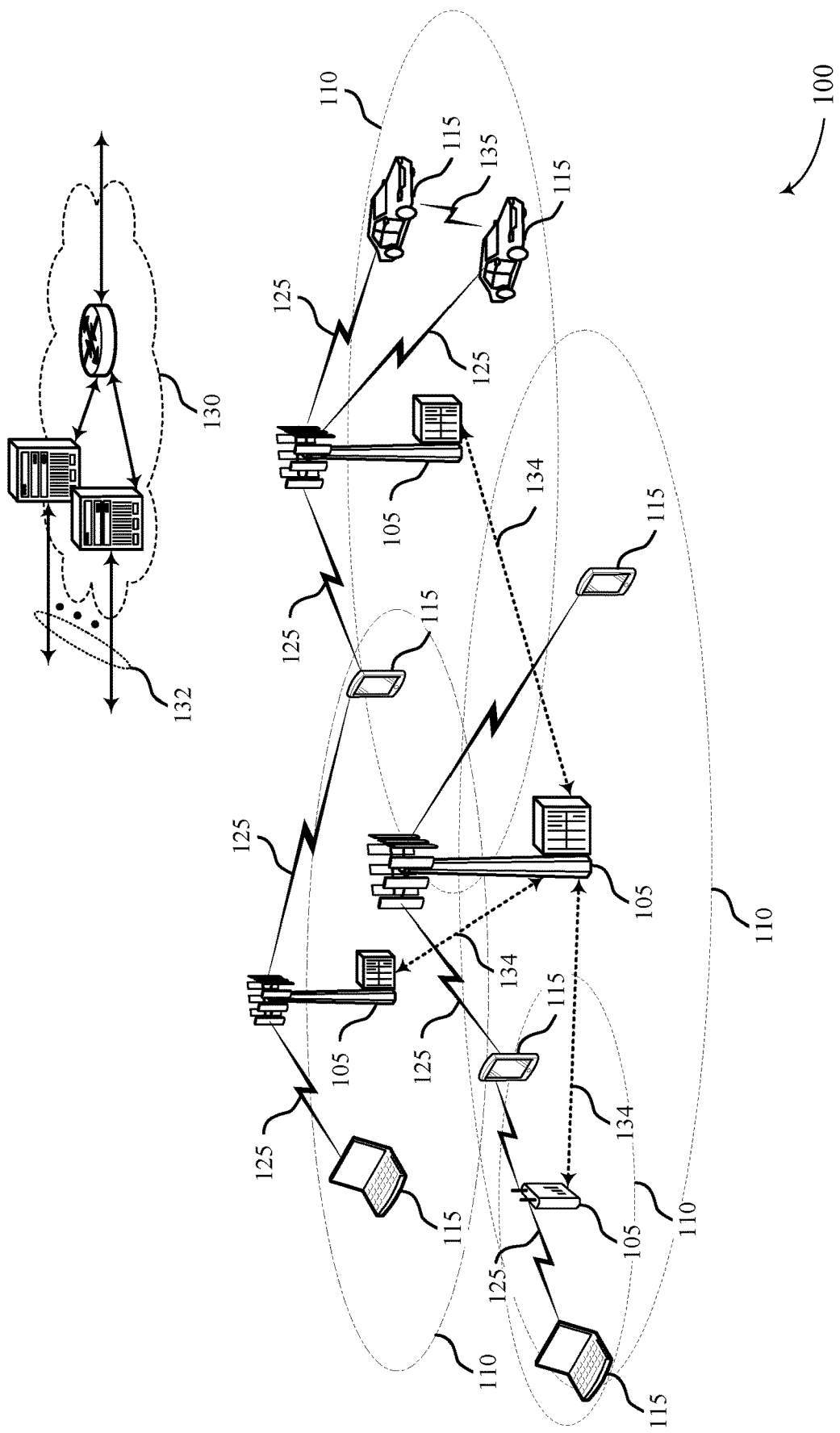
FIG. 1 illustrates an example of a system for wireless communications that supports power control indication in groupcast sidelink communications in accordance with aspects of the present disclosure.

A wireless communications system may support both access links and sidelinks for communications between wireless devices. An access link may refer to any communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). In some examples, a UE may transmit over one or more sidelinks to a group of UEs, and the transmitting UE may be referred to as a transmitting UE while UEs in the group of UEs may be referred to as receiving UEs. A transmitting device (e.g., a transmitting UE) may in some cases be referred to as a transmitter. Further, various aspects of the teachings herein may in some cases be explained with reference to groupcast, in which one transmitter (e.g., a groupcast transmitter) transmits the same information (e.g., set of one or more messages) to multiple target (e.g., receiving) devices.

It is noted, however, that while various examples provided herein are discussed for UE sidelink devices, such sidelink techniques may be used for any type of wireless devices (e.g., UEs, base stations, etc.) that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. Further, while various examples may be provided herein for a groupcast context, this is just one example context, and the teachings herein may be applied in non-groupcast contexts as well.

Various sidelink connections between sidelink devices may be used to support data flows between the devices. In some cases, one sidelink UE may transmit the same data to multiple targeted UEs in a groupcast sidelink transmission. In such cases, each UE in a group of UEs that are to receive the groupcast transmissions may establish a sidelink connection with a sidelink groupcast transmitting UE, and may subscribe to the group (e.g., to receive periodic updates from the sidelink groupcast transmitting UE on conditions or status at the sidelink groupcast transmitting UE). In various existing deployments for sidelink communications, the UEs that receive sidelink transmissions from a sidelink transmitting UE have not had a mechanism to provide feedback related to the transmission power of the sidelink transmitting UE. Thus, the sidelink transmitting UE may measure one or more channel characteristics associated with one or more sidelink receiving UEs (e.g., a received signal strength of a transmission from a sidelink receiving UE) and set transmission power based on the measurements. Such techniques may not allow for efficient adjustments of transmit power as the distance or channel conditions between the two UEs change. Various aspects of the present disclosure provide techniques for transmit power adjustments in sidelink communications.

According to various aspects of the disclosure, techniques provide for a sidelink groupcast transmitting UE to receive transmit power control (TPC) indications from one or more other sidelink UEs that receive groupcast transmissions from the sidelink groupcast transmitting UE. Based on the TPC indications, the sidelink groupcast transmitting UE, in some cases, may increase or decrease transmission power of the groupcast transmissions for more efficient and reliable transmissions. In some cases, each UE of a set of UEs that receive groupcast transmissions from the sidelink groupcast transmitting UE may have a different set of wireless resources that may be used to transmit the TPC indication to the sidelink groupcast transmitting UE. Such different sets of resources may provide for relatively reliable communication of TPC indications with reduced interference from other TPC indications of other UEs. In some cases, the wireless resources for TPC indications may be allocated by a base station that serves the sidelink UEs, and may be provided to one or more of the sidelink UEs by the base station. In some cases, one or more UEs that receive the groupcast sidelink transmissions may be out of coverage of the base station, and may receive the wireless resources for the TPC indications from one or other UEs, such as the sidelink groupcast transmitting UE.

Additionally or alternatively, a first set of wireless resources may be allocated for indications to increase transmission power at the sidelink groupcast transmitting UE (e.g., TPC-UP indications) and a second set of wireless resources may be allocated for indications to decrease transmission power at the sidelink groupcast transmitting UE (e.g., TPC-DOWN indications). Such separate sets of wireless resources may provide reduced interference for UEs requesting increases in transmission power through separation from requests for decreased transmission power (i.e., from UEs that are likely closer to the sidelink groupcast transmitting UE and thus have higher power signals at the sidelink groupcast transmitting UE). The sidelink groupcast transmitting UE may adjust a transmission power of the sidelink transmissions based on the received TPC indications. In some cases, a majority rule may be used, in which transmit power at the sidelink groupcast transmitting UE may be adjusted based on whether more TPC-UP indications or TPC-DOWN indications are received. In other cases, the sidelink groupcast transmitting UE may increase groupcast transmission power based on receiving at least one TPC-UP indication, irrespective of how many TPC-DOWN indications are received, in order to provide sufficient signal strength for a receiving UE with poorer channel conditions than other of the receiving UEs.

In some cases, a UE that receives the groupcast sidelink transmissions may provide TPC indications based on its proximity to the sidelink groupcast transmitting UE. In such cases, if a UE is within a distance threshold of the sidelink groupcast transmitting UE, the UE may provide TPC indications to the sidelink groupcast transmitting UE, and if a UE is outside of the distance threshold such indications may be discontinued. In such cases, a UE that discontinues providing TPC indications may opportunistically monitor for the groupcast transmissions. If such a UE then moves back within the distance threshold, TPC indications may be resumed. Additionally or alternatively, a UE may discontinue providing TPC indications if the UE determines that its transmit power requests are not impacting the transmission power of the groupcast transmissions (e.g., based on detecting a same or increased power after one or more TPC-DOWN requests). Additionally or alternatively, UEs that provide TPC indications may use a preconfigured transmission power to transmit the power control indications, may use an open loop power control technique to determine the transmission power at which to transmit the power control indications, or combinations thereof.

Techniques such as discussed herein thus provide for enhanced reliability and efficiency for sidelink communications. For example, by adjusting transmit power, a sidelink groupcast transmitting UE may provide communications that have a higher likelihood of successful receipt at a receiving UEs while using a transmission power that is based on current channel conditions. Further, the sidelink groupcast transmitting UE may use the TPC feedback to adjust transmission power relatively quickly, which may be beneficial in deployments where UEs may have relatively fast movement amongst each other (e.g., in vehicle-to-vehicle communications).

Aspects of the disclosure are initially described in the context of a wireless communications system. Several examples of sidelink communications systems operating according to techniques provided herein are then described. Aspects of the disclosure are further illustrated by and described with reference to apparatus diagrams, system diagrams, and flowcharts that relate to power control indication in groupcast sidelink communications.

FIG. 1 illustrates an example of a wireless communications system 100 that supports power control indication in groupcast sidelink communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 via a sidelink connection 135 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group (e.g., in a connection-based multicast configuration). In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In cases where two or more UEs 115 communicate using sidelink connections 135, TPC indications may be provided between sidelink UEs 115 that may be used to adjust the transmit power of a transmitting UE. In some cases, a group of UEs 115 may use sidelink groupcast transmissions for communications, and a sidelink groupcast transmitter may increase or decrease transmission power of the groupcast transmissions for more efficient and reliable transmissions. In some cases, each UE 115 that receives groupcast transmissions from the sidelink groupcast transmitter may have a different set of wireless resources that may be used to transmit the TPC indication. In other cases, separate wireless resources may be provided for TPC-UP indications and for TPC-DOWN indications. Such different sets of resources may provide for relatively reliable communication of TPC indications with reduced interference from other TPC indications that may be concurrently transmitted.

Figure 2:
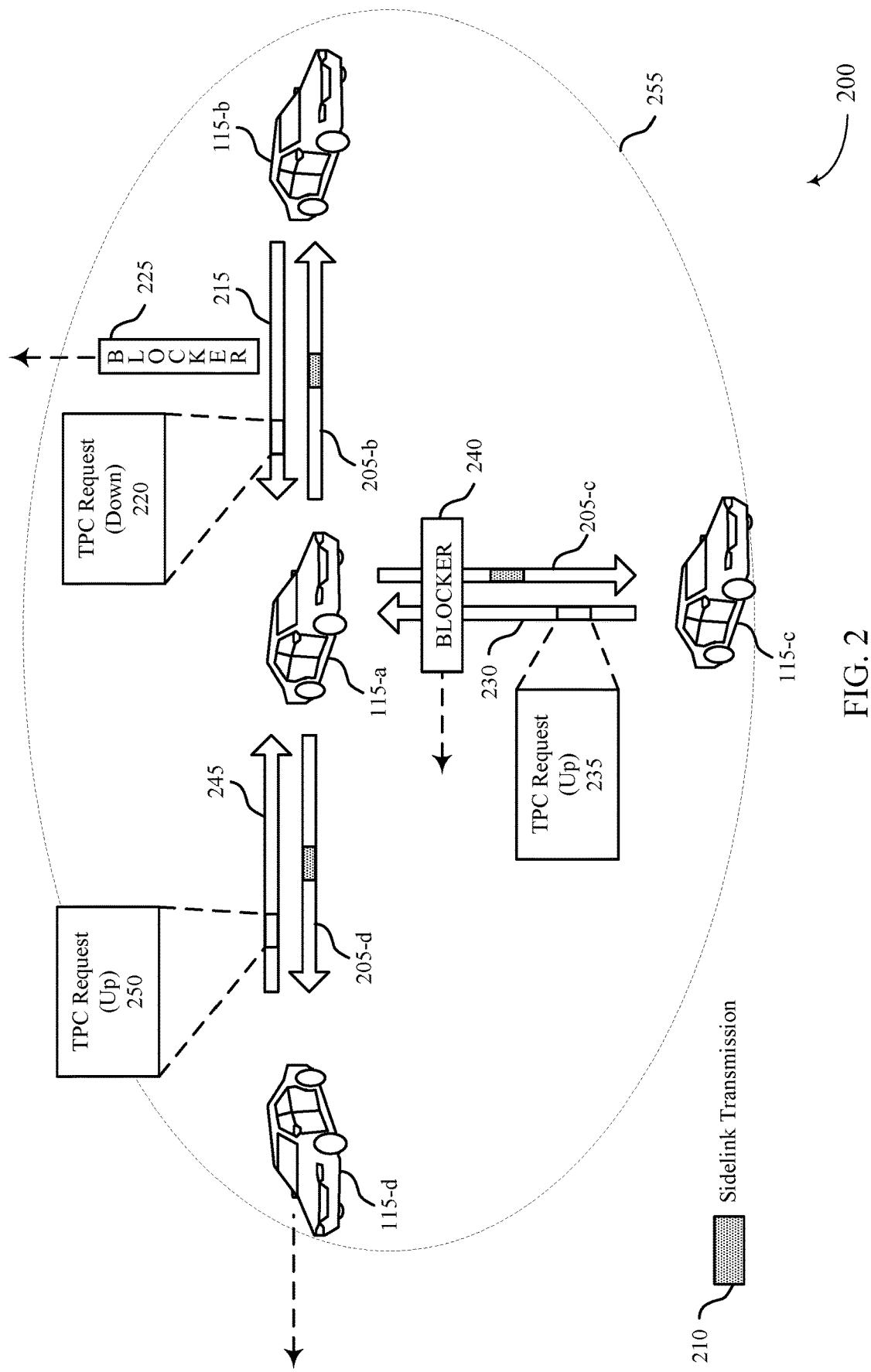
FIGS. 2 through 5 illustrate examples of sidelink communications systems that supports power control indication in groupcast sidelink communications in accordance with aspects of the present disclosure.

FIG. 2 illustrates an example of a sidelink communications system 200 that supports power control indication in groupcast sidelink communications in accordance with aspects of the present disclosure. In some examples, sidelink communications system 200 may implement aspects of wireless communications system 100. A sidelink communications system of this example may include a first UE 115-*a* that is a sidelink groupcast transmitting UE, and multiple sidelink groupcast receiving UEs 115 that include a second UE 115-*b*, a third UE 115-*c*, and a fourth UE 115-*d*, which may be examples of UEs 115 as described above with reference to FIG. 1. In this example, UEs 115 may establish a sidelink groupcast group in which the first UE 115-*a* transmits sidelink groupcast transmissions 210 to each of the other UEs 115 of the group.

In the example of FIG. 2, the second UE 115-*b* may receive sidelink groupcast transmissions 210 via sidelink channel 205-*b*, and may transmit a TPC request 220 to the first UE 115-*a* via sidelink channel 215. Likewise, the third UE 115-*c* may receive sidelink transmissions via sidelink channel 205-*c* and transmit a TPC request 235 to the first UE 115-*a* via sidelink channel 230, and the fourth UE 115-*d* may receive sidelink transmissions via sidelink channel 205-*d* and transmit a TPC request 250 to the first UE 115-*a* via sidelink channel 245. As shown, UEs 115 may be vehicles, where the sidelink communications may be via a groupcast V2X communications link between the first UE 115-*a* and the other UEs 115. In some cases, the TPC requests are transmitted to the first UE 115-*a* in response to a physical sidelink shared channel (PSSCH) transmission of the first UE 115-*a*, and may provide relatively fast feedback to the first UE 115-*a* for transmit power adjustments.

In some cases, the first UE 115-*a* may be referred to as an initiating or transmitting UE 115 that initiates the groupcast communications procedure, and second UE 115-*b*, third UE 115-*c*, and fourth UE 115-*d* may be referred to as a target or receiving UEs 115. Such sidelink communications may be established in accordance with established connection procedures, such as through a PC5 connection for sidelink communications, and an associated V2X layer may have a transmission profile or transport profile configured that is associated with sidelink communications.

As discussed herein, the TPC requests to the first UE 115-*a* may provide indications from each UE 115 of whether higher or lower transmit power of the first UE 115-*a* is requested. For example, the second UE 115-*b* may have previously been subject to interference from a blocker 225 that recently moved away from the second UE 115-*b* (e.g., another vehicle that moves out of a line of sight between the first UE 115-*a* and the second UE 115-*b*), which results in the second UE 115-*b* seeing lower interference and thus does not need as strong a signal from the first UE 115-*a*. In such cases, the second UE 115-*b* may transmit a TPC-DOWN indication in the TPC request 220. Further, in the example illustrated in FIG. 2, the third UE 115-*c* may be impacted by a blocker 240 moving such that interference between the first UE 115-*a* and the third UE 115-*c* increases. In such cases, the third UE 115-*c* may transmit a TPC-UP request in the TPC request 235. Further, in this example, the fourth UE 115-*d* may be moving away from the first UE 115-*a*, which results in lower signal strength at the fourth UE 115-*d*, and a TPC-UP request may be provided in the TPC request 250.

The first UE 115-*a*, upon receiving the TPC requests, may then determine an adjustment to the transmission power of the sidelink groupcast transmissions 210. In some cases, where a single beam (e.g., an omnidirectional beam or relatively wide transmission beam) of the first UE 115-*a* covers multiple other UEs 115, a majority rule may be used, in which transmit power at the first UE 115-*a* may be adjusted based on whether more TPC-UP indications or TPC-DOWN indications are received. In other cases, the first UE 115-*a* may increase groupcast transmission power based on receiving at least one TPC-UP indication, irrespective of how many TPC-DOWN indications are received, in order to provide sufficient signal strength for a receiving UE 115 with poorer channel conditions than other of the receiving UEs 115. In cases where relatively narrow beams are used that may cover only a single UE 115, transmit power may be adjusted on a beam-by-beam basis by the first UE 115-*a*, as will be discussed in more detail with reference to FIG. 5.

In some cases, the transmission of a TPC request may be based on a proximity of a UE 115 from the first UE 115-*a*. For example, if a distance from the first UE 115-*a* is outside of a threshold distance illustrated as distance 255 in FIG. 2, the receiving UE 115 may discontinue transmitting TPC requests and may opportunistically receive the sidelink groupcast transmissions 210. In this example, the fourth UE 115-*d* may, after traveling beyond the threshold distance 255 from the first UE 115-*a*, may stop transmitting TPC requests. If the fourth UE 115-*d* subsequently moves to be back within the threshold distance 255, TPC indications may be resumed. In some cases the threshold distance 255 may be based on a number of factors, such as a type of communications of the sidelink groupcast transmissions, a speed at which the first UE 115-*a* is traveling, transmit power limitations of the first UE 115-*a* (e.g., a distance associated with reliable communications at a maximum transmit power of the first UE 115-*a* may be set as the threshold distance 255). In some cases, the threshold distance 255 and wireless resources for transmission of the TPC requests may be provided to the UEs 115 in sidelink configuration information that may be provided by a serving base station, for example, via radio resource control (RRC) signaling. In some cases, if one or more UEs 115 are out of a coverage range of the base station, sidelink configuration information may be provided by one or more other sidelink UEs 115. Further, in some cases, a receiving UE 115 may abstain from transmitting a TPC request, such as if the UE determines that a receive power of the sidelink groupcast transmissions 210 is adequate and no other receiving UEs 115 are in the vicinity, an increase in transmit power may not have an impact on the UE and thus the TPC request may not be transmitted.

Additionally or alternatively, a receiving UE 115, such as second UE 115-*b*, third UE 115-*c*, or fourth UE 115-*d*, may discontinue transmitting TPC indications, if it is determined that the UE 115 is not a constraint on power adjustments. For example, the second UE 115-*b*, after blocker 225 moves away, may be relatively close to the first UE 115-*a*, while the fourth UE 115-*d* is moving away from the first UE 115-*a* and thus provides a constraint against reducing transmit power at the first UE 115-*a*. In such cases, the second UE 115-*b* may transmit one or more TPC-DOWN indications and measure a received signal strength of the sidelink groupcast transmissions 210. Based on the signal strength the second UE 115-*b* may determine that transmit power of the first UE 115-*a* is not reduced and therefore the second UE 115-*b* is not impacting the transmit power. Thus, the second UE 115-*b* may discontinue transmitting TPC requests, or reduce a frequency at which such requests are transmitted. In some cases, if a receiving UE 115 sees a random correlation between measured transmit power and TPC requests, the UE may discontinue or reduce the number of TPC requests sent, while another receiving UE 115 that sees a positive correlation between TPC requests and transmit power of the first UE 115-*a* may continue providing TPC indications.

In some cases, the TPC requests may be transmitted at a power that is determined by the receiving UEs 115 that transmit the TPC requests. In some cases, a TPC-UP request may be transmitted at a maximum transmission power of the UE to help insure that the first UE 115-*a* receives the TPC-UP request. In some cases, TPC-DOWN requests may be transmitted according to an open loop power control procedure, or at a predetermined transmission power. In some cases, an open-loop power control procedure may be used when the UE is able to estimate a pathloss between the receiving UE and the transmitting UE. In some cases, power control schemes or settings may be provided in sidelink configuration information from a serving base station of from another sidelink UE.

The TPC requests may be transmitted to the first UE 115-*a*, in some cases, in sidelink control signaling (e.g., on a physical sidelink control channel (PSCCH) or PSSCH), such as in a medium access control (MAC) control element (CE), in an information element provided in uplink control information (UCI), downlink control information (DCI), sidelink control information (SCI), or any combinations thereof. The wireless resources used for transmission of the TPC requests, in some cases, may be determined based on a per-UE resource assignment, as discussed with reference to FIG. 3, or based on whether a TPC-UP or TPC-DOWN request is transmitted, as discussed with reference to FIG. 4.

Figure 3:
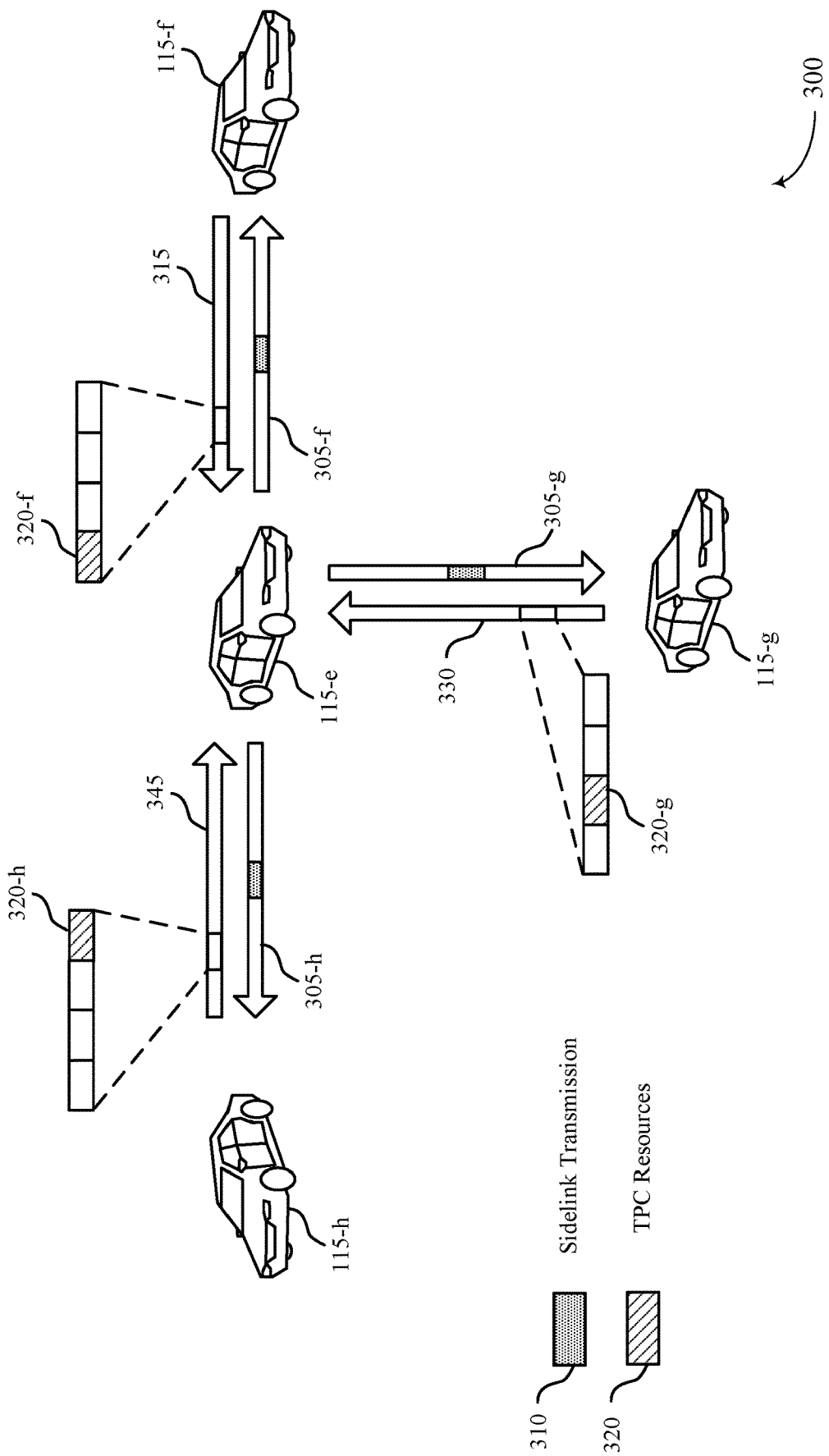

FIG. 3 illustrates an example of a sidelink communications system 300 that supports power control indication in groupcast sidelink communications in accordance with aspects of the present disclosure. In some examples, sidelink communications system 300 may implement aspects of wireless communications system 100 or 200. A sidelink communications system of this example may include a first UE 115-*e* that is a sidelink groupcast transmitting UE, and multiple sidelink groupcast receiving UEs 115 that include a second UE 115-*f*, a third UE 115-*g*, and a fourth UE 115-*h*, which may be examples of UEs 115 as described above with reference to FIGS. 1 and 2. In this example, UEs 115 may establish a sidelink groupcast group in which the first UE 115-*e* transmits sidelink groupcast transmissions 310 to each of the other UEs 115 of the group.

In the example of FIG. 3, each of the second UE 115-*f*, third UE 115-*g*, and fourth UE 115-*h* may be provided with non-overlapping or partially overlapping wireless resources (e.g., time/frequency resources) that are to be used for TPC request transmissions. For example, the second UE 115-*f* may receive sidelink groupcast transmissions 310 via sidelink channel 305-*f*, and may transmit a TPC request using TPC resources 320-*f* to the first UE 115-*e* via sidelink channel 315. Likewise, the third UE 115-*g* may receive sidelink transmissions via sidelink channel 305-*g* and transmit a TPC request using TPC resources 320-*g* to the first UE 115-*e* via sidelink channel 330, and the fourth UE 115-*h* may receive sidelink transmissions via sidelink channel 305-*h* and transmit a TPC request using TPC resources 320-*h* to the first UE 115-*e* via sidelink channel 345.

In this example, the TPC resources 320 that are allocated to each UE 115 may be time resources, although different frequency resources, or combinations of time/frequency resources may also be used for TPC request transmissions. The second UE 115*4*, third UE 115-*g*, and fourth UE 115-*h* may thus use the associated TPC resources 320 for TPC request transmissions, which may be transmitted to the first UE 115-*e* in response to PSSCH. The different wireless resource allocations may provide a higher likelihood of successful receipt of the TPC requests at the first UE 115-*e* than if shared resources were used (e.g., due to a close UE 115 interfering with a TPC requests of a farther away UE 115). The first UE 115-*e* may monitor these individual resources for TPC commands and adjust its transmit power based on the received TPC information, in a manner such as discussed with reference to FIG. 2, for example. In other examples, different wireless resources may be allocated for different TPC requests, as is discussed with reference to FIG. 4.

Figure 4:
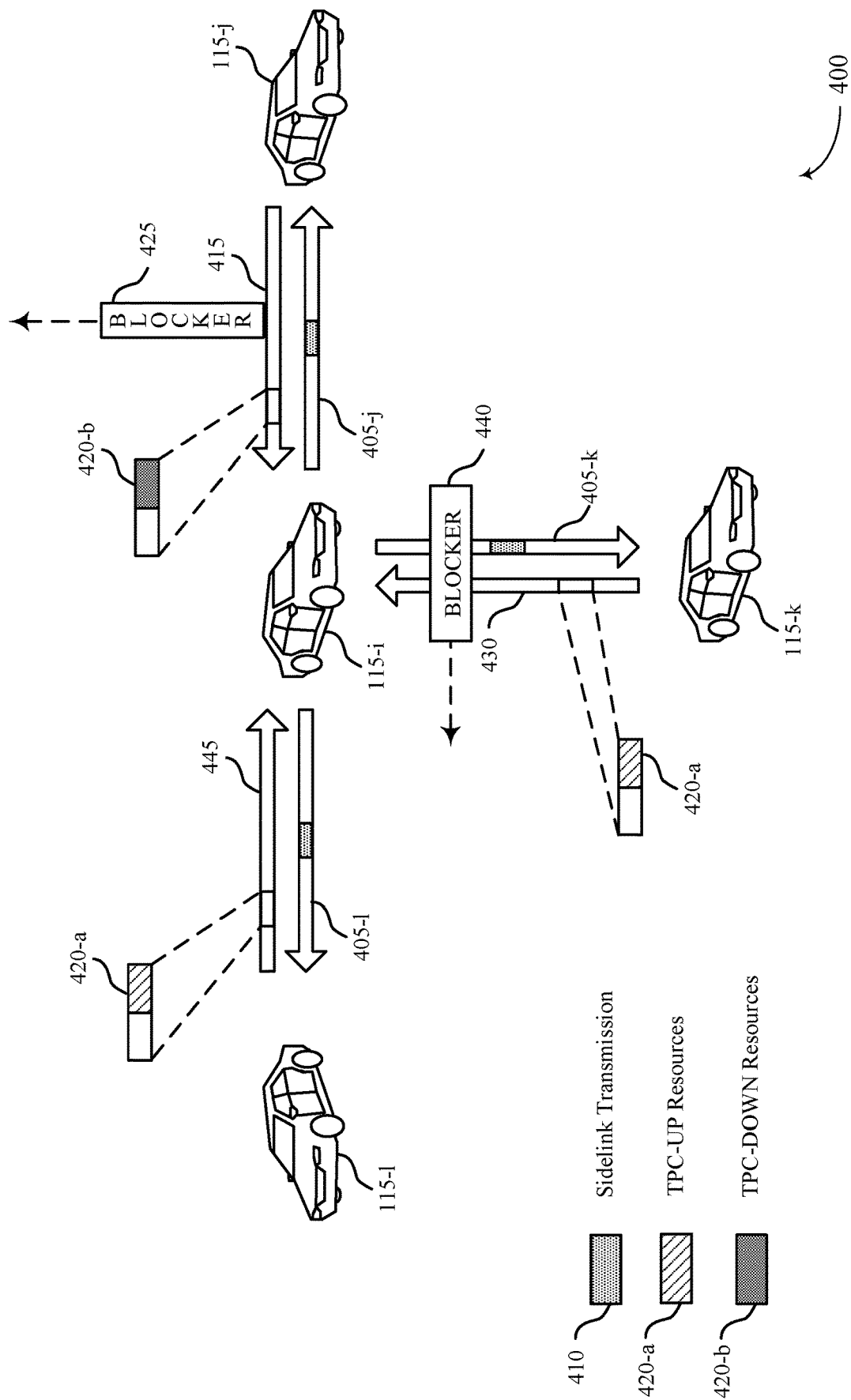

FIG. 4 illustrates an example of a sidelink communications system 400 that supports power control indication in groupcast sidelink communications in accordance with aspects of the present disclosure. In some examples, sidelink communications system 400 may implement aspects of wireless communications system 100 or 200. A sidelink communications system of this example may include a first UE 115-*i* that is a sidelink groupcast transmitting UE, and multiple sidelink groupcast receiving UEs 115 that include a second UE 115-*j*, a third UE 115-*k*, and a fourth UE 115-1, which may be examples of UEs 115 as described above with reference to FIGS. 1 and 2. In this example, UEs 115 may establish a sidelink groupcast group in which the first UE 115-*i* transmits sidelink groupcast transmissions 410 to each of the other UEs 115 of the group.

In the example of FIG. 4, each of the second UE 115-*j*, third UE 115-*k*, and fourth UE 115-1 may be provided with a first set of wireless resources 420-*a* for transmission of TPC-UP requests, and a second set of wireless resources 420-*b* for transmission of TPC-DOWN requests. For example, the second UE 115-*j* may receive sidelink groupcast transmissions 410 via sidelink channel 405-*j*, and due to blocker 425 moving out of a link-of-sight between the first UE 115-*i* and the second UE 115-*j*, may determine to transmit a TPC-DOWN request, that may be transmitted using the second set of wireless resources 420-*b* to the first UE 115-*i* via sidelink channel 415. Likewise, the third UE 115-*k* may receive sidelink transmissions via sidelink channel 405-*k* and, due to block 440 increasing interference with the third UE 115-*k*, may transmit a TPC-UP request using the first set of wireless resources 420-*a* to the first UE 115-*i* via sidelink channel 430. Further, the fourth UE 115-1 may receive sidelink transmissions via sidelink channel 405-1 and transmit a TPC-UP request using the first set of wireless resources 420-*a* to the first UE 115-*i* via sidelink channel 445.

In this example, the first set of wireless resources 420-*a* and the second set of wireless resources 420-*b* may be time resources, although different frequency resources, or combinations of time/frequency resources may also be used. In some cases, each UE may be provided with different scrambling codes or different resources within the TPC-UP resources or TPC-DOWN resources to avoid collisions in cases where multiple UEs may transmit. In some cases, the TCP-UP resources may be selected such that interference from transmissions using TPC-DOWN resources is unlikely, which may be beneficial due to the likelihood of transmissions using TPC-DOWN resources having a higher received signal strength at the first UE 115-*i* (e.g., due to UEs transmitting TPC-DOWN being more likely to be relatively close to the first UE 115-*i*). The first UE 115-*i* may monitor the different sets of resources for TPC commands and adjust its transmit power based on the received TPC information, in a manner such as discussed with reference to FIG. 2, for example.

Figure 5:
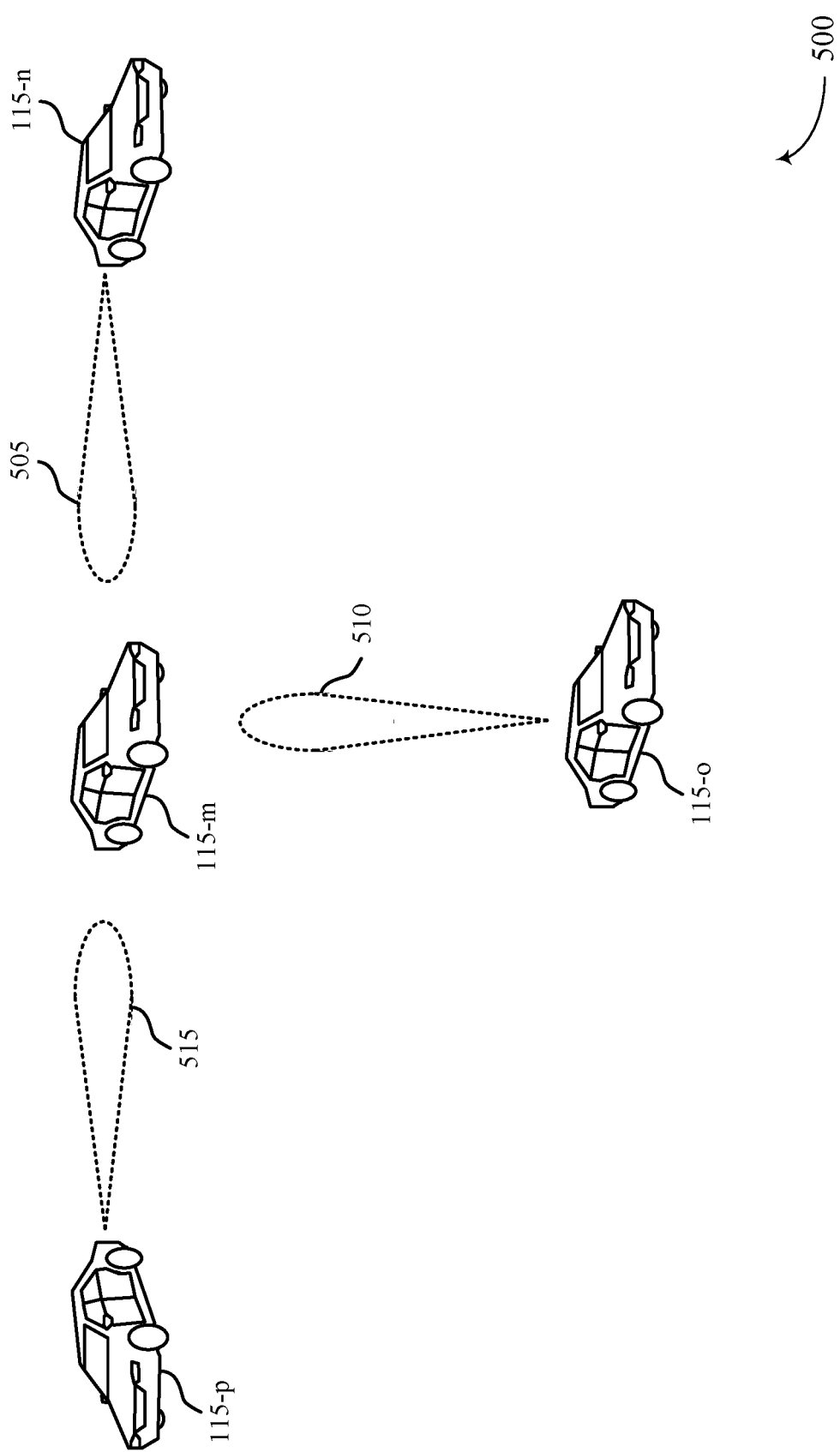

FIG. 5 illustrates an example of a sidelink communications system 500 that supports power control indication in groupcast sidelink communications in accordance with aspects of the present disclosure. In some examples, sidelink communications system 500 may implement aspects of wireless communications system 100 or 200. A sidelink communications system of this example may include a first UE 115-*m* that is a sidelink groupcast transmitting UE, and multiple sidelink groupcast receiving UEs 115 that include a second UE 115-*n*, a third UE 115-*o*, and a fourth UE 115-*p*, which may be examples of UEs 115 as described above with reference to FIGS. 1 and 2. In this example, UEs 115 may establish a sidelink groupcast group in which the first UE 115-*m* transmits sidelink groupcast transmissions to each of the other UEs 115 of the group.

In the example of FIG. 5, each of the second UE 115-*n*, third UE 115-*o*, and fourth UE 115-*p* may use different beams for communications with the first UE 115-*m*. For example, the first UE 115-*m* and the second UE 115-*n* may communicate using a first beam 505, first UE 115-*m* and the third UE 115-*o* may communicate using a second beam 510, and the first UE 115-*m* and the fourth UE 115-*p* may communicate using a third beam 515. In such examples where different transmission beams are sued, the first UE 115-*m* may apply individual TPC commands to individual beams based on the association between the beam and the receiving UE 115 and TPC request resources of each beam. The first UE 115-*m* may individually adjust the transmit power on a per-beam basis based on the associated TPC. In some cases, multiple UEs may communicate using one of the beams, in which case different TPC resources may be allocated such as discussed with reference to FIGS. 3 and 4, and the first UE 115-*m* may monitor the different resources for TPC commands and adjust its transmit power (e.g., using techniques as discussed with reference to FIG. 2) based on the received TPC information.

Figure 6:
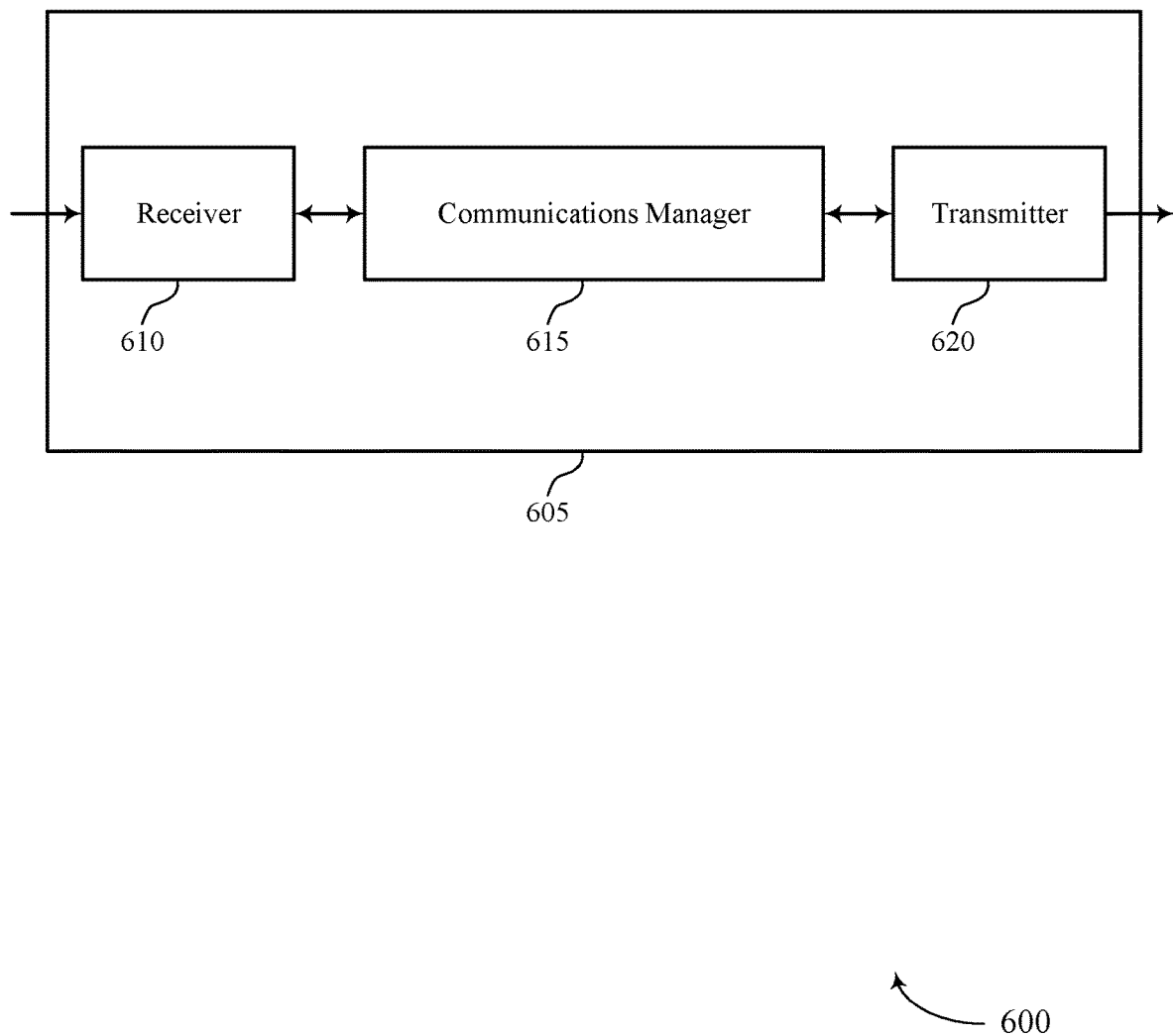
FIGS. 6 and 7 show block diagrams of devices that support power control indication in groupcast sidelink communications in accordance with aspects of the present disclosure.

FIG. 6 shows a block diagram 600 of a device 605 that supports power control indication in groupcast sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power control indication in groupcast sidelink communications, etc.). Information may be passed on to other components of the device 605. The receiver 610 may be an example of aspects of the transceiver 920 described with reference to FIG. 9. The receiver 610 may utilize a single antenna or a set of antennas.

In some cases, the communications manager 615 may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter, determine the first transmit power control indication based on a measured signal strength of the device-to-device sidelink communication from the groupcast transmitter, and transmit the first transmit power control indication to the groupcast transmitter via the first set of wireless resources.

In some cases, the communications manager 615 may also identify a first set of wireless resources for indicating a power-up transmit power control request to a groupcast transmitter of a device-to-device sidelink communication, and a second set of wireless resources for indicating a power-down transmit power control request to the groupcast transmitter, where the first set of wireless resources is different than the second set of wireless resources, select which of the first set of wireless resources or the second set of wireless resources is to be used to transmit a first transmit power control indication based on the determining, determine which of the power-up transmit power control request or the power-down transmit power control request is to be indicated to the groupcast transmitter based on a measured signal strength of the device-to-device sidelink communication from the groupcast transmitter, and transmit the first transmit power control indication to the groupcast transmitter via the selected set of wireless resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. Implementations described herein may provide improved quality and reliability of service at the UE 115, because by adjusting transmit power, a sidelink groupcast transmitting UE may provide communications that have a higher likelihood of successful receipt at a receiving UEs while using a transmission power that is based on current channel conditions.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
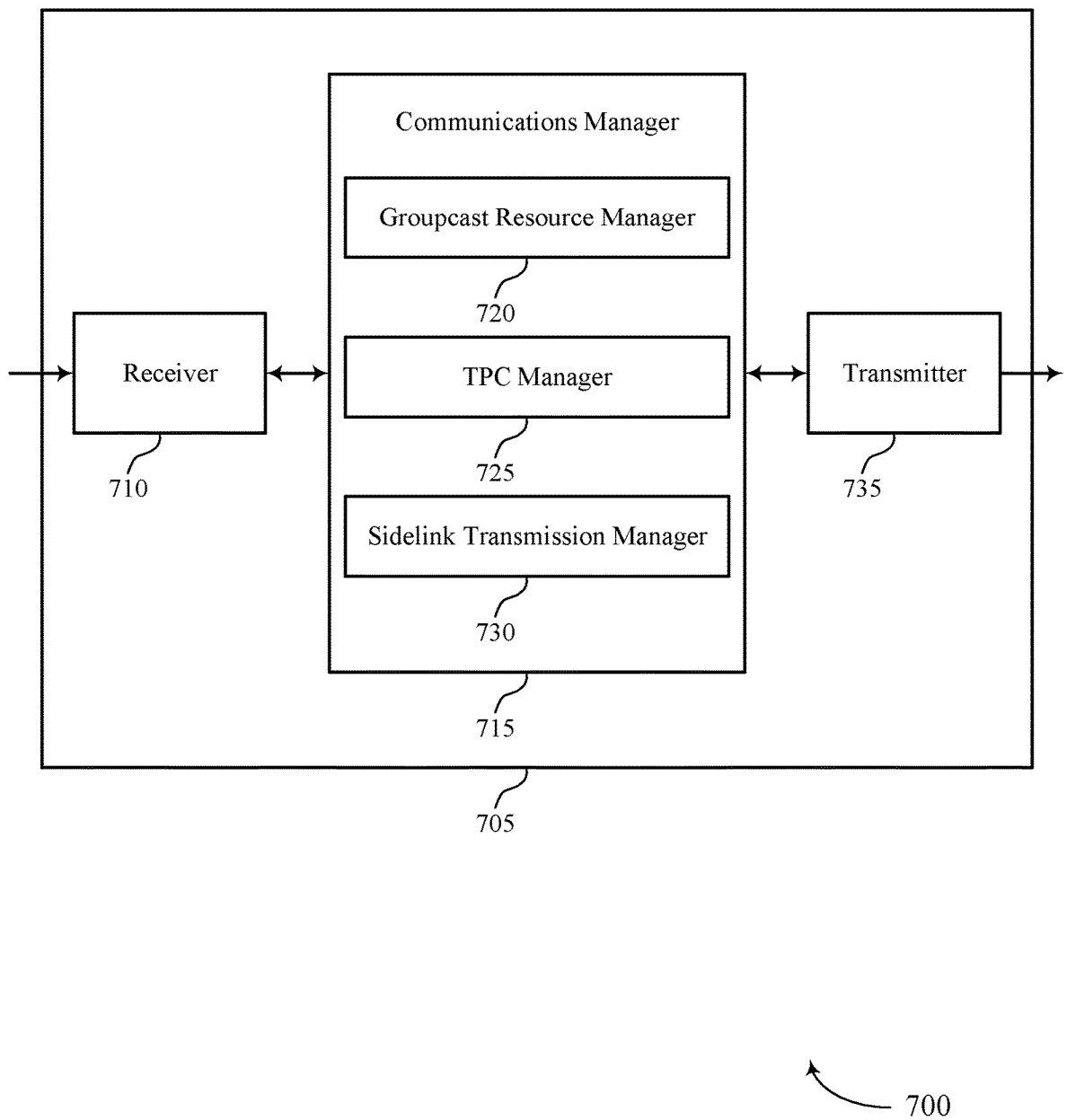

FIG. 7 shows a block diagram 700 of a device 705 that supports power control indication in groupcast sidelink communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to power control indication in groupcast sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a groupcast resource manager 720, a TPC manager 725, and a sidelink transmission manager 730. The communications manager 715 may be an example of aspects of the communications manager 910 described herein.

In some cases, the groupcast resource manager 720 may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter. The TPC manager 725 may determine the first transmit power control indication based on a measured signal strength of the device-to-device sidelink communication from the groupcast transmitter. The sidelink transmission manager 730 may transmit the first transmit power control indication to the groupcast transmitter via the first set of wireless resources.

In some cases, the groupcast resource manager 720 may identify a first set of wireless resources for indicating a power-up transmit power control request to a groupcast transmitter of a device-to-device sidelink communication, and a second set of wireless resources for indicating a power-down transmit power control request to the groupcast transmitter, where the first set of wireless resources is different than the second set of wireless resources and select which of the first set of wireless resources or the second set of wireless resources is to be used to transmit a first transmit power control indication based on the determining. The TPC manager 725 may determine which of the power-up transmit power control request or the power-down transmit power control request is to be indicated to the groupcast transmitter based on a measured signal strength of the device-to-device sidelink communication from the groupcast transmitter. The sidelink transmission manager 730 may transmit the first transmit power control indication to the groupcast transmitter via the selected set of wireless resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
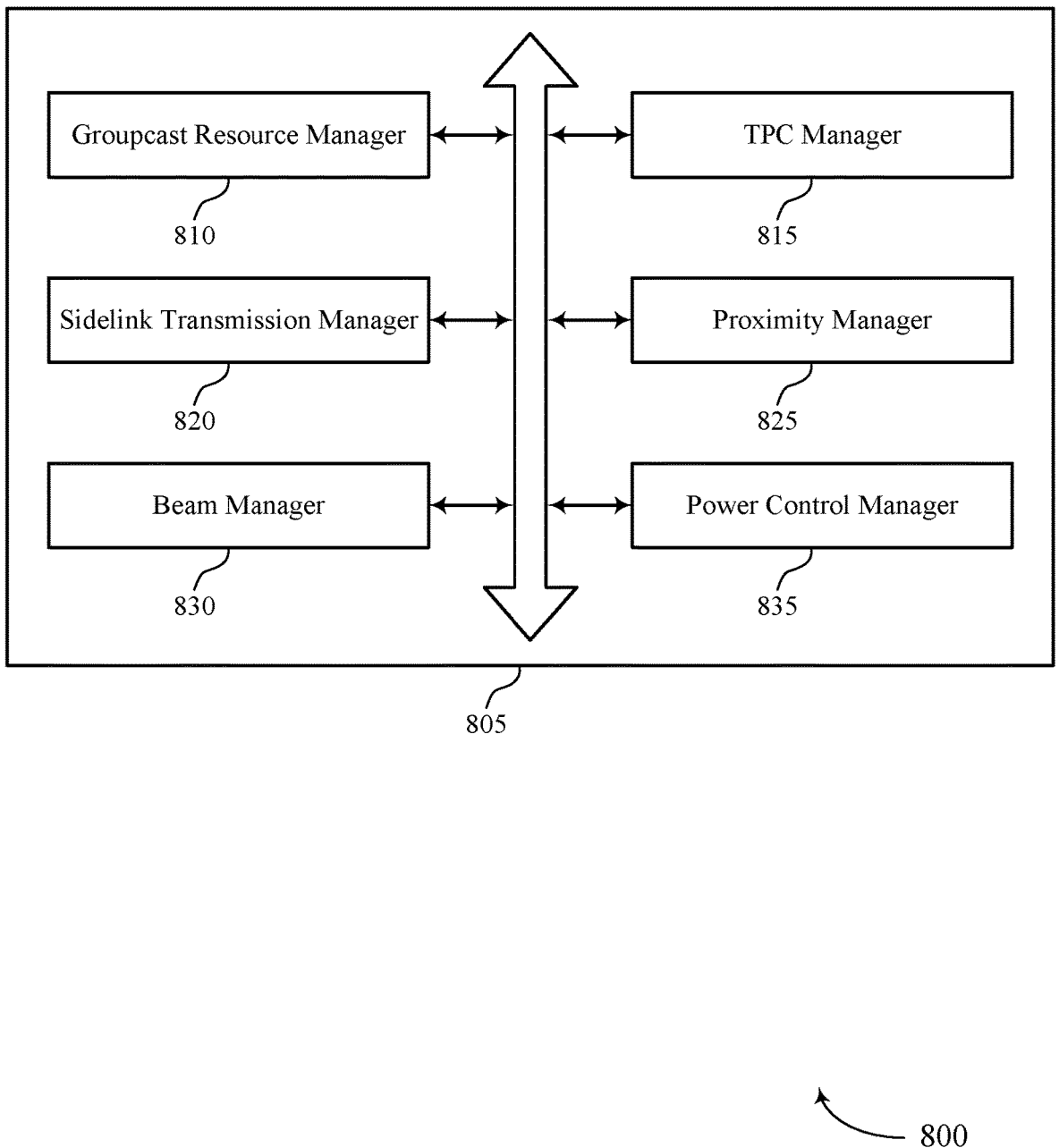
FIG. 8 shows a block diagram of a communications manager that supports power control indication in groupcast sidelink communications in accordance with aspects of the present disclosure.

FIG. 8 shows a block diagram 800 of a communications manager 805 that supports power control indication in groupcast sidelink communications in accordance with aspects of the present disclosure. The communications manager 805 may be an example of aspects of a communications manager 615, a communications manager 715, or a communications manager 910 described herein. The communications manager 805 may include a groupcast resource manager 810, a TPC manager 815, a sidelink transmission manager 820, a proximity manager 825, a beam manager 830, and a power control manager 835. Each of these modules may communicate, directly or indirectly, with one another (e.g., via one or more buses).

The groupcast resource manager 810 may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter. In some examples, the groupcast resource manager 810 may receive an indication of the first set of wireless resources from one or more of a base station that serves the groupcast transmitter and the first UE, the groupcast transmitter, another UE of the group of UEs, or any combinations thereof.

In some examples, the groupcast resource manager 810 may identify a first set of wireless resources for indicating a power-up transmit power control request to a groupcast transmitter of a device-to-device sidelink communication, and a second set of wireless resources for indicating a power-down transmit power control request to the groupcast transmitter, where the first set of wireless resources is different than the second set of wireless resources. In some examples, the groupcast resource manager 810 may select which of the first set of wireless resources or the second set of wireless resources is to be used to transmit a first transmit power control indication based on the determining. In some examples, the groupcast resource manager 810 may receive an indication of the first set of wireless resources and the second set of wireless resources from one or more of a base station that serves the groupcast transmitter and the first UE, the groupcast transmitter, another UE of a group of UEs that receives the device-to-device sidelink communication from the groupcast transmitter, or any combinations thereof.

In some examples, the groupcast resource manager 810 may determine, prior to identifying the first set of wireless resources, to subscribe to groupcast transmissions of the groupcast transmitter, and where the identifying the first set of wireless resources is performed responsive to subscribing to the groupcast transmissions of the groupcast transmitter. In some cases, the groupcast transmitter communicates using an omnidirectional beam, and where the first set of wireless resources include a first set of time resources, a first set of frequency resources, or combinations thereof.

The TPC manager 815 may determine the first transmit power control indication based on a measured signal strength of the device-to-device sidelink communication from the groupcast transmitter. In some examples, the TPC manager 815 may determine which of the power-up transmit power control request or the power-down transmit power control request is to be indicated to the groupcast transmitter based on a measured signal strength of the device-to-device sidelink communication from the groupcast transmitter.

In some examples, the TPC manager 815 may determine that one or more other UEs of the group of UEs are causing transmit power adjustments of the groupcast transmitter. In some examples, the TPC manager 815 may discontinue the transmitting of the first transmit power control indication based on the determining that one or more other UEs of the group of UEs are causing transmit power adjustments of the groupcast transmitter.

In some examples, the TPC manager 815 may transmit one or more power down indications to the groupcast transmitter. In some examples, the TPC manager 815 may determine that the groupcast transmitter has maintained or increased transmission power after the one or more power down indications. In some examples, the TPC manager 815 may discontinue the transmitting of the first transmit power control indication based on the determining that one or more other UEs of the group of UEs are causing transmit power adjustments of the groupcast transmitter.

In some examples, the TPC manager 815 may set a transmit power of the first transmit power control indication based on which of the first set of wireless resources or the second set of wireless resources is selected. In some cases, the determining the first transmit power control indication is performed responsive to a physical sidelink shared channel (PSSCH) transmission of the groupcast transmitter.

The sidelink transmission manager 820 may transmit the first transmit power control indication to the groupcast transmitter via the first set of wireless resources.

The proximity manager 825 may determine a distance between the groupcast transmitter and the first UE. In some examples, the proximity manager 825 may discontinue the determining and the transmitting of the first transmit power control indication based on the distance exceeding a threshold distance value. In some examples, the proximity manager 825 may opportunistically monitor, after the discontinuing, for groupcast transmissions of the groupcast transmitter. In some examples, the proximity manager 825 may determine, after the discontinuing, that the distance between the groupcast transmitter and the first UE is less than the threshold distance value. In some examples, the proximity manager 825 may resume the determining and the transmitting of the first transmit power control indication based on the distance being less than the threshold distance value.

The beam manager 830 may manage one or more transmission beams of the UE. In some cases, the first set of wireless resources are associated with a first beam of a set of beams used by the groupcast transmitter for groupcast communications.

The power control manager 835 may set a transmit power of the first transmit power control indication at a maximum transmission power of the first UE based on the first transmit power control indication requesting a higher transmit power at the groupcast transmitter. In some examples, the power control manager 835 may determine that a lower transmit power at the groupcast transmitter is to be requested by the first UE. In some examples, the power control manager 835 may set a transmit power of the first transmit power control indication according to an open loop power control procedure or according to a preconfigured transmit power responsive to the determining that the lower transmit power is requested.

Figure 9:
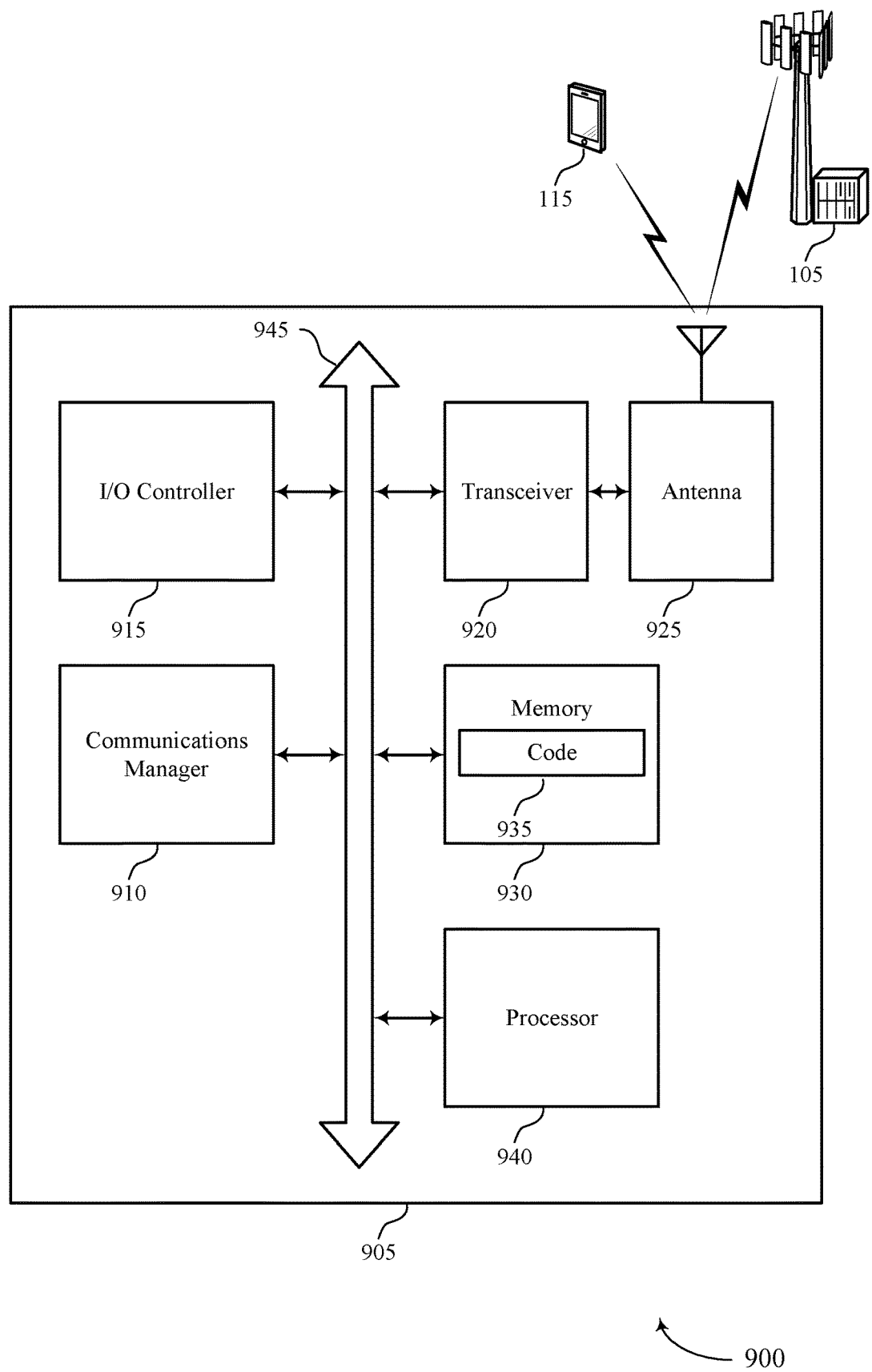
FIG. 9 shows a diagram of a system including a device that supports power control indication in groupcast sidelink communications in accordance with aspects of the present disclosure.

FIG. 9 shows a diagram of a system 900 including a device 905 that supports power control indication in groupcast sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

In some cases, the communications manager 910 may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter, determine the first transmit power control indication based on a measured signal strength of the device-to-device sidelink communication from the groupcast transmitter, and transmit the first transmit power control indication to the groupcast transmitter via the first set of wireless resources.

In some cases, the communications manager 910 may also identify a first set of wireless resources for indicating a power-up transmit power control request to a groupcast transmitter of a device-to-device sidelink communication, and a second set of wireless resources for indicating a power-down transmit power control request to the groupcast transmitter, where the first set of wireless resources is different than the second set of wireless resources, select which of the first set of wireless resources or the second set of wireless resources is to be used to transmit a first transmit power control indication based on the determining, determine which of the power-up transmit power control request or the power-down transmit power control request is to be indicated to the groupcast transmitter based on a measured signal strength of the device-to-device sidelink communication from the groupcast transmitter, and transmit the first transmit power control indication to the groupcast transmitter via the selected set of wireless resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power control indication in groupcast sidelink communications).

By adjusting transmission power relatively quickly, a UE 115 may provide communications that have a higher likelihood of successful receipt. As such, the processor 940 may save power through the reduction of a ramp up in processing power if communications must be provided again.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
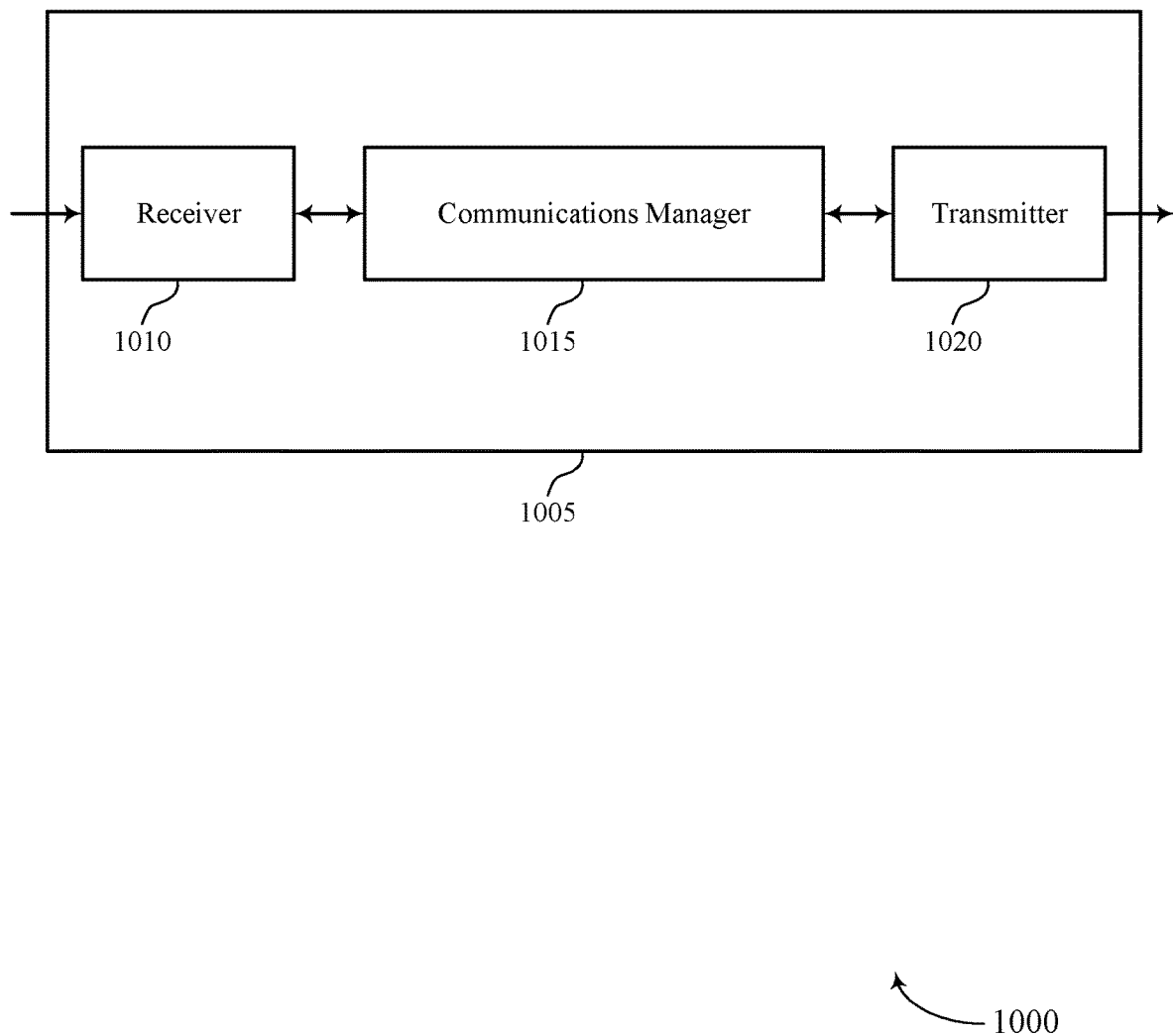
FIGS. 10 and 11 show block diagrams of devices that support power control indication in groupcast sidelink communications in accordance with aspects of the present disclosure.

FIG. 10 shows a block diagram 1000 of a device 1005 that supports power control indication in groupcast sidelink communications in accordance with aspects of the present disclosure. The device 1005 may be an example of aspects of a UE 115 or base station 105 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to power control indication in groupcast sidelink communications, etc.). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The communications manager 1015 may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE, monitor the number of different sets of wireless resources for one or more transmit power control indications from one or more of the group of receiving UEs, determine a transmission power adjustment for the groupcast transmissions based on the one or more transmit power control indications, and transmit the groupcast transmissions at a transmission power that is based on the transmission power adjustment.

The communications manager 1015 may also identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources, monitor the first set of wireless resources and the second set of wireless resources for one or more transmit power control indications from the one or more receiving UEs, determine a transmission power adjustment for the groupcast transmissions based on the one or more transmit power control indications, and transmit the groupcast transmissions at a transmission power that is based on the transmission power adjustment. The communications manager 1015 may be an example of aspects of the communications manager 1310 or 1410 as described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. Implementations described herein may provide improved quality and reliability of service at the base station 105, because communications that have a higher likelihood of successful receipt while using a transmission power that is based on current channel conditions.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 or 1420 as described with reference to FIGS. 13 and 14. The transmitter 1020 may utilize a single antenna or a set of antennas.

Figure 11:
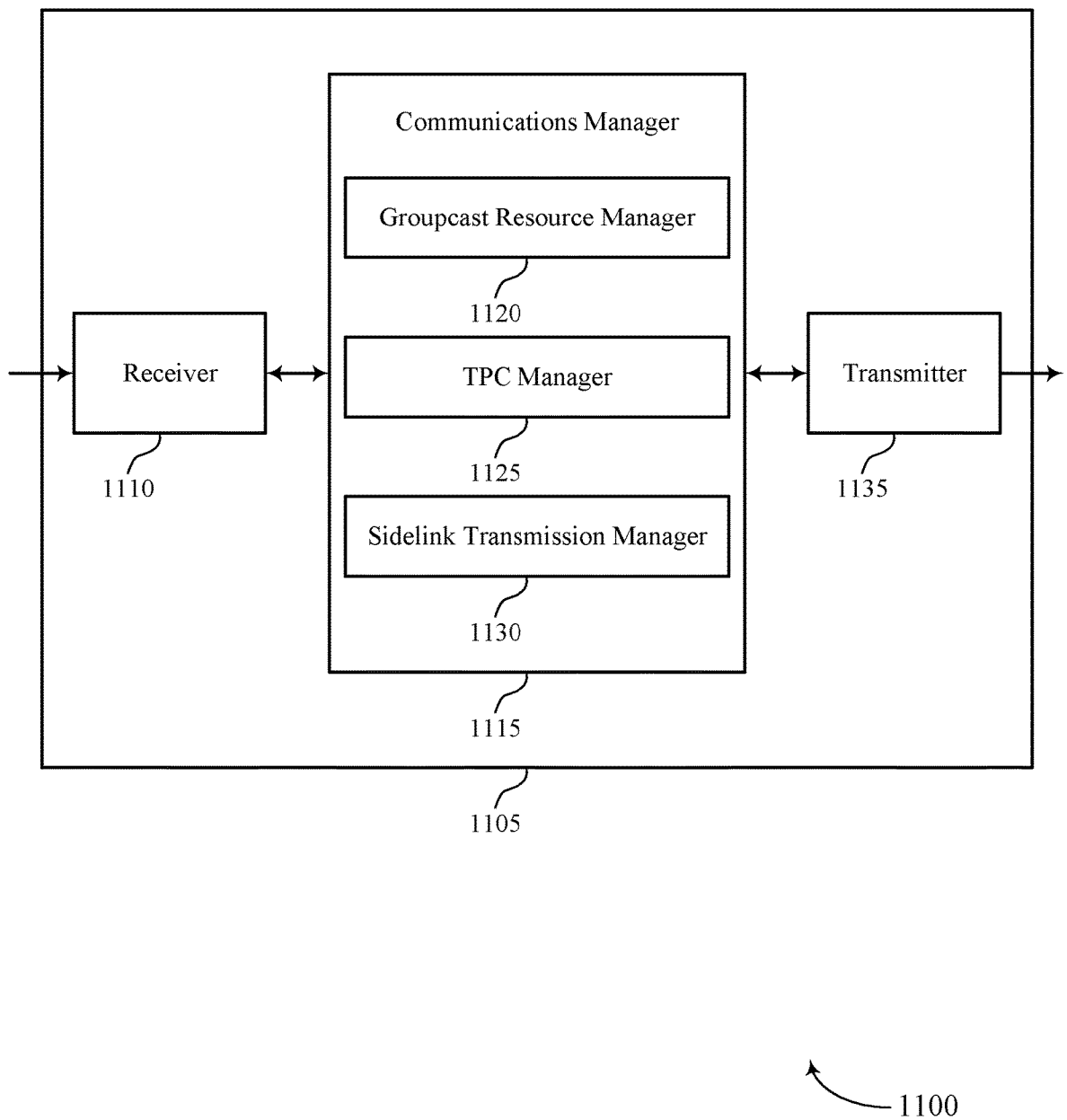

FIG. 11 shows a block diagram 1100 of a device 1105 that supports power control indication in groupcast sidelink communications in accordance with aspects of the present disclosure. The device 1105 may be an example of aspects of a device 1005, a UE 115, or a base station 105 as described herein. The device 1105 may include a receiver 1110, a communications manager 1115, and a transmitter 1135. The device 1105 may also include a processor. Each of these components may be in communication with one another (e.g., via one or more buses).

Receiver 1110 may receive information such as packets, user data, or control information associated with various information channels (e.g., control channels, data channels, and information related to power control indication in groupcast sidelink communications, etc.). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The communications manager 1115 may be an example of aspects of the communications manager 1015 as described herein. The communications manager 1115 may include a groupcast resource manager 1120, a TPC manager 1125, and a sidelink transmission manager 1130. The communications manager 1115 may be an example of aspects of the communications manager 1310 or 1410 as described herein.

In some cases, the groupcast resource manager 1120 may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE. The TPC manager 1125 may monitor the number of different sets of wireless resources for one or more transmit power control indications from one or more of the group of receiving UEs and determine a transmission power adjustment for the groupcast transmissions based on the one or more transmit power control indications. The sidelink transmission manager 1130 may transmit the groupcast transmissions at a transmission power that is based on the transmission power adjustment.

In some cases, the groupcast resource manager 1120 may identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources. The TPC manager 1125 may monitor the first set of wireless resources and the second set of wireless resources for one or more transmit power control indications from the one or more receiving UEs and determine a transmission power adjustment for the groupcast transmissions based on the one or more transmit power control indications. The sidelink transmission manager 1130 may transmit the groupcast transmissions at a transmission power that is based on the transmission power adjustment.

Transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 or 1420 as described with reference to FIGS. 13 and 14. The transmitter 1135 may utilize a single antenna or a set of antennas.

Figure 12:
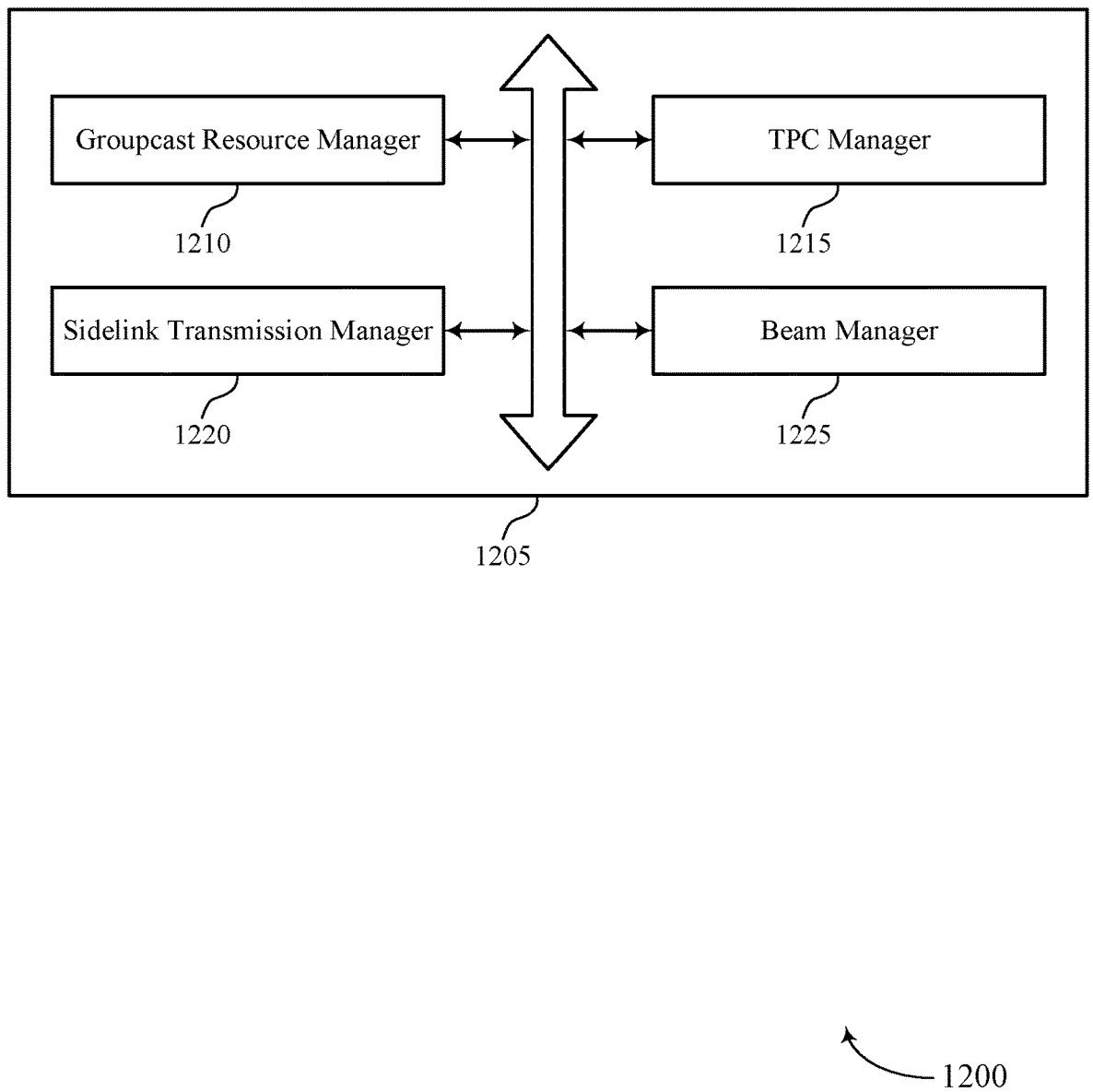
FIG. 12 shows a block diagram of a communications manager that supports power control indication in groupcast sidelink communications in accordance with aspects of the present disclosure.

FIG. 12 shows a block diagram 1200 of a communications manager 1205 that supports power control indication in groupcast sidelink communications in accordance with aspects of the present disclosure. The communications manager 1205 may be an example of aspects of a communications manager 1015, a communications manager 1115, or a communications manager 1310 described herein. The communications manager 1205 may include a groupcast resource manager 1210, a TPC manager 1215, a sidelink transmission manager 1220, and a beam manager 1225. Each of these modules may communicate, directly or indirectly, with one another (e.g., via one or more buses).

The groupcast resource manager 1210 may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE. In some examples, the groupcast resource manager 1210 may receive an indication of the number of different sets of wireless resources from one or more of a base station that serves the groupcast transmitting UE, another UE of the group of UEs, or any combinations thereof.

In some examples, the groupcast resource manager 1210 may identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources.

The TPC manager 1215 may monitor the number of different sets of wireless resources for one or more transmit power control indications from one or more of the group of receiving UEs. In some examples, the TPC manager 1215 may determine a transmission power adjustment for the groupcast transmissions based on the one or more transmit power control indications. In some examples, the TPC manager 1215 may monitor the first set of wireless resources and the second set of wireless resources for one or more transmit power control indications from the one or more receiving UEs.

In some examples, the TPC manager 1215 may determine to reduce the transmission power of the groupcast transmissions based on receiving more power control down indications than power control up indications. In some examples, the TPC manager 1215 may determine to increase the transmission power of the groupcast transmissions based on receiving more power control up indications than power control down indications. In some examples, the TPC manager 1215 may determine to reduce the transmission power of the groupcast transmissions based on receiving one or more transmission power control down indications in the one or more transmit power control indications in an absence of any transmission power control up indications.

The sidelink transmission manager 1220 may transmit the groupcast transmissions at a transmission power that is based on the transmission power adjustment.

The beam manager 1225 may determine to reduce the transmission power a first beam used for the groupcast transmissions based on receiving one or more transmission power control down indications in the one or more transmit power control indications associated with the first beam in an absence of any transmission power control up indications associated with the first beam. In some examples, the beam manager 1225 may determine to increase the transmission power of the first beam used for the groupcast transmissions based on receiving at least one transmission power control up indication associated with the first beam. In some cases, the first set of wireless resources and the second set of wireless resources are identified for each beam used for the groupcast transmissions.

Figure 13:
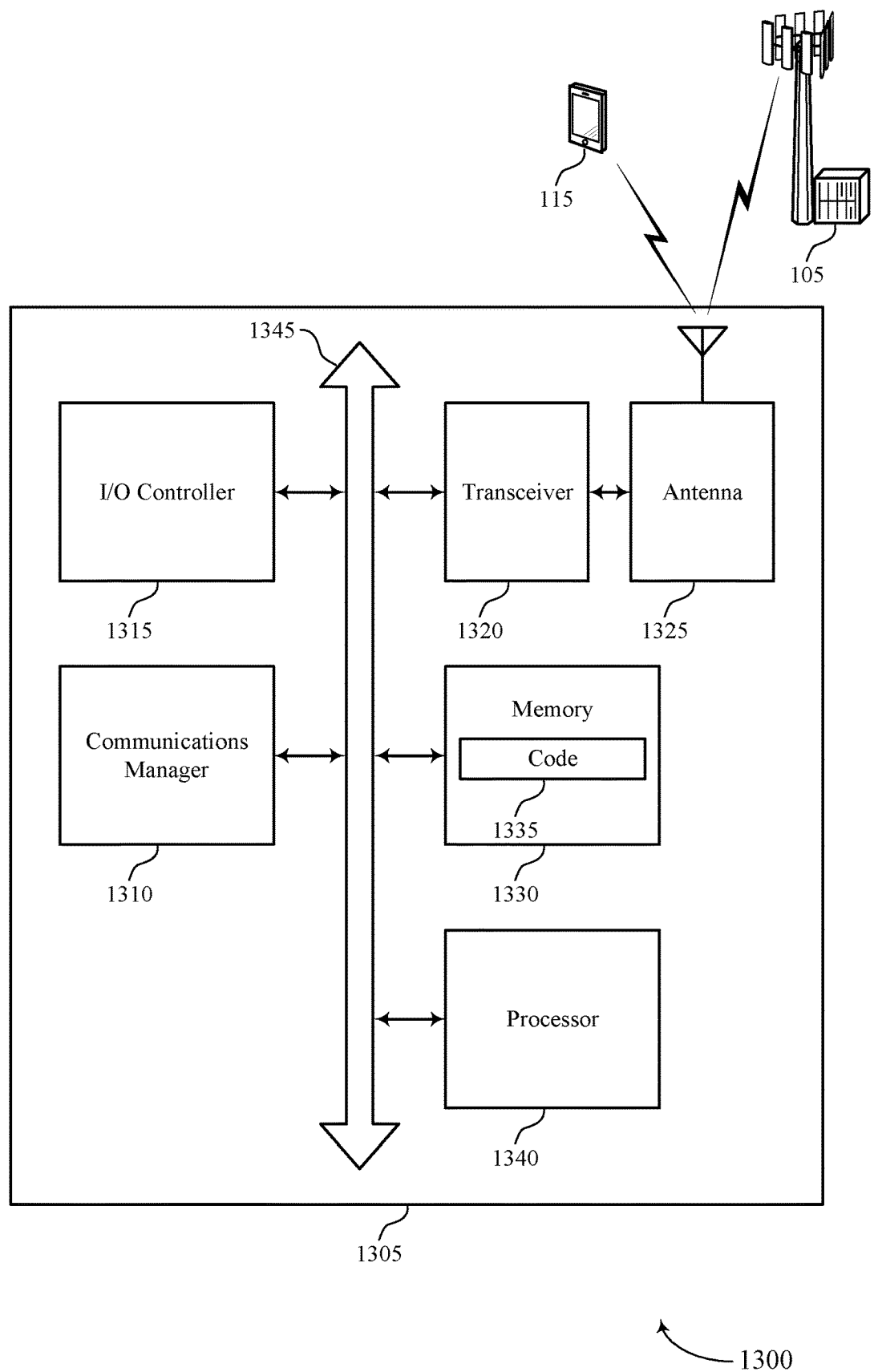
FIG. 13 shows a diagram of a system including a user equipment (UE) that supports power control indication in groupcast sidelink communications in accordance with aspects of the present disclosure.

FIG. 13 shows a diagram of a system 1300 including a device 1305 that supports power control indication in groupcast sidelink communications in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, a transceiver 1320, an antenna 1325, memory 1330, a processor 1340, and an I/O controller 1315. These components may be in electronic communication via one or more buses (e.g., bus 1345).

The communications manager 1310 may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE, monitor the number of different sets of wireless resources for one or more transmit power control indications from one or more of the group of receiving UEs, determine a transmission power adjustment for the groupcast transmissions based on the one or more transmit power control indications, and transmit the groupcast transmissions at a transmission power that is based on the transmission power adjustment.

The communications manager 1310 may also identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources, monitor the first set of wireless resources and the second set of wireless resources for one or more transmit power control indications from the one or more receiving UEs, determine a transmission power adjustment for the groupcast transmissions based on the one or more transmit power control indications, and transmit the groupcast transmissions at a transmission power that is based on the transmission power adjustment.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power control indication in groupcast sidelink communications).

By adjusting transmission power relatively quickly, a base station 105 may provide communications that have a higher likelihood of successful receipt. As such, the processor 1340 may save power through the reduction of a ramp up in processing power if communications must be provided again.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
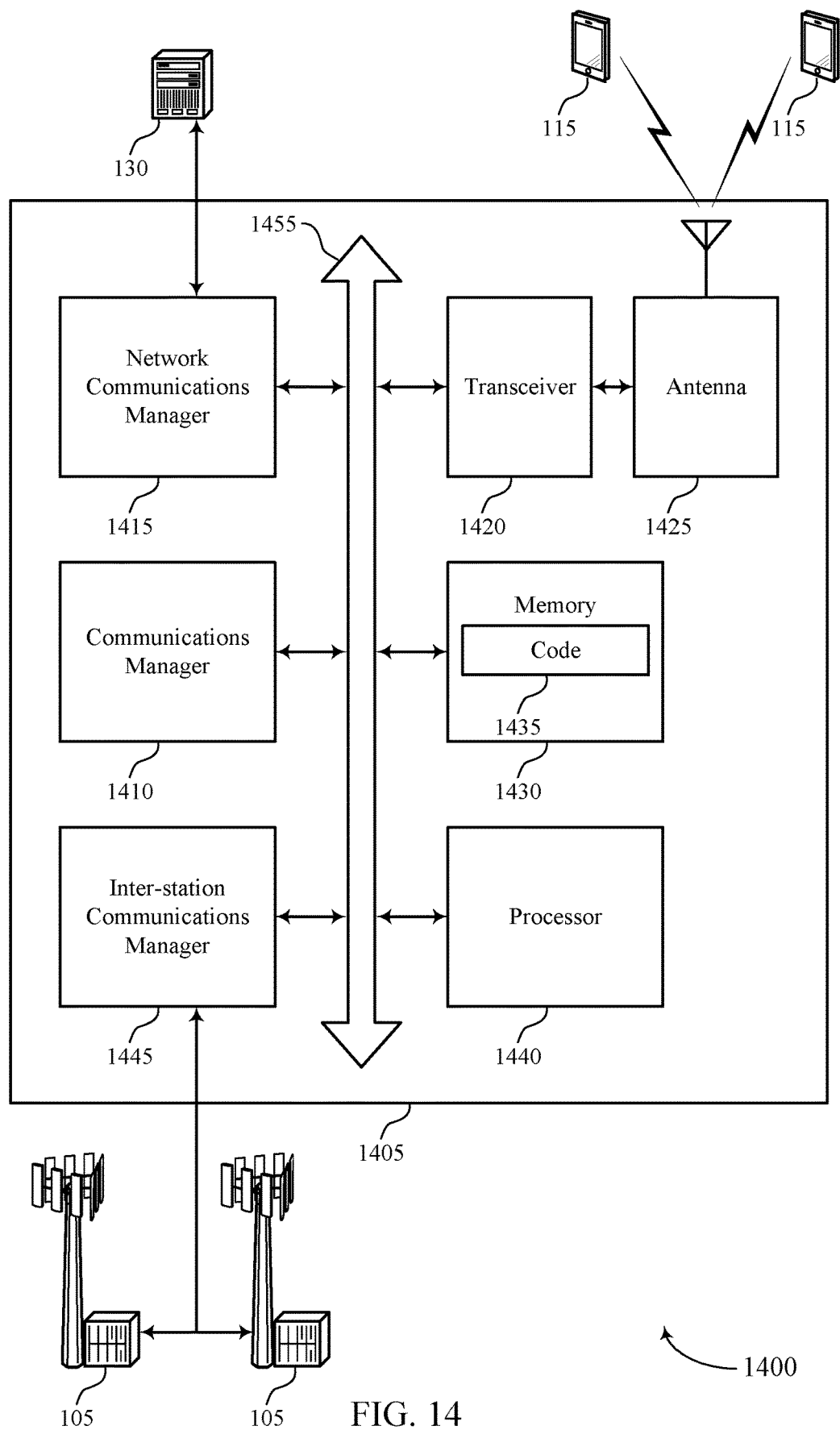
FIG. 14 shows a diagram of a system including a base station that supports power control indication in groupcast sidelink communications in accordance with aspects of the present disclosure.

FIG. 14 shows a diagram of a system 1400 including a device 1405 that supports power control indication in groupcast sidelink communications in accordance with aspects of the present disclosure. The device 1405 may be an example of or include the components of device 1005, device 1105, or a base station 105 as described herein. The device 1405 may include components for bi-directional voice and data communications including components for transmitting and receiving communications, including a communications manager 1410, a network communications manager 1450, a transceiver 1420, an antenna 1425, memory 1430, a processor 1440, and an inter-station communications manager 1455. These components may be in electronic communication via one or more buses (e.g., bus 1445).

The communications manager 1410 may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE, monitor the number of different sets of wireless resources for one or more transmit power control indications from one or more of the group of receiving UEs, determine a transmission power adjustment for the groupcast transmissions based on the one or more transmit power control indications, and transmit the groupcast transmissions at a transmission power that is based on the transmission power adjustment.

The communications manager 1410 may also identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources, monitor the first set of wireless resources and the second set of wireless resources for one or more transmit power control indications from the one or more receiving UEs, determine a transmission power adjustment for the groupcast transmissions based on the one or more transmit power control indications, and transmit the groupcast transmissions at a transmission power that is based on the transmission power adjustment.

Network communications manager 1450 may manage communications with the core network (e.g., via one or more wired backhaul links). For example, the network communications manager 1450 may manage the transfer of data communications for client devices, such as one or more UEs 115.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting power control indication in groupcast sidelink communications).

Inter-station communications manager 1455 may manage communications with other base station 105, and may include a controller or scheduler for controlling communications with UEs 115 in cooperation with other base stations 105. For example, the inter-station communications manager 1455 may coordinate scheduling for transmissions to UEs 115 for various interference mitigation techniques such as beamforming or joint transmission. In some examples, inter-station communications manager 1455 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
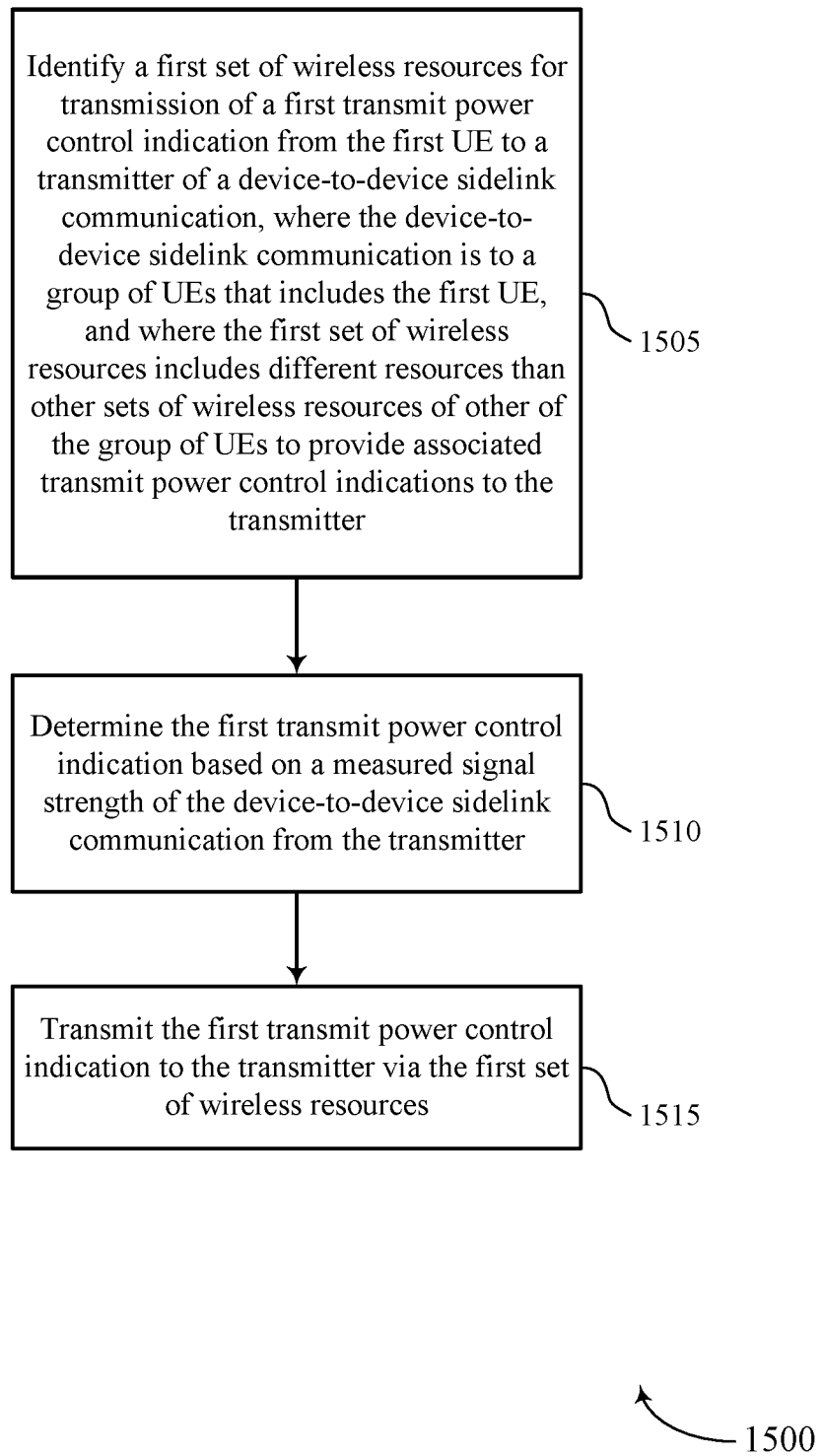
FIGS. 15 through 22 show flowcharts illustrating methods that support power control indication in groupcast sidelink communications in accordance with aspects of the present disclosure.

FIG. 15 shows a flowchart illustrating a method 1500 that supports power control indication in groupcast sidelink communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter. The operations of 1505 may be performed according to the methods described herein. In some examples, aspects of the operations of 1505 may be performed by a groupcast resource manager as described with reference to FIG. 6 through 9. Additionally or alternatively, means for performing 1505 may, but not necessarily, include, for example, antenna 925, transceiver 920, communications manager 910, memory 930 (including code 935), processor 940 and/or bus 945.

At 1510, the UE may determine the first transmit power control indication based on a measured signal strength of the device-to-device sidelink communication from the groupcast transmitter. The operations of 1510 may be performed according to the methods described herein. In some examples, aspects of the operations of 1510 may be performed by a TPC manager as described with reference to FIGS. 6 through 9. Additionally or alternatively, means for performing 1510 may, but not necessarily, include, for example, communications manager 910, memory 930 (including code 935), processor 940 and/or bus 945.

At 1515, the UE may transmit the first transmit power control indication to the groupcast transmitter via the first set of wireless resources. The operations of 1515 may be performed according to the methods described herein. In some examples, aspects of the operations of 1515 may be performed by a sidelink transmission manager as described with reference to FIGS. 6 through 9. Additionally or alternatively, means for performing 1515 may, but not necessarily, include, for example, antenna 925, transceiver 920, communications manager 910, memory 930 (including code 935), processor 940 and/or bus 945.

Figure 16:
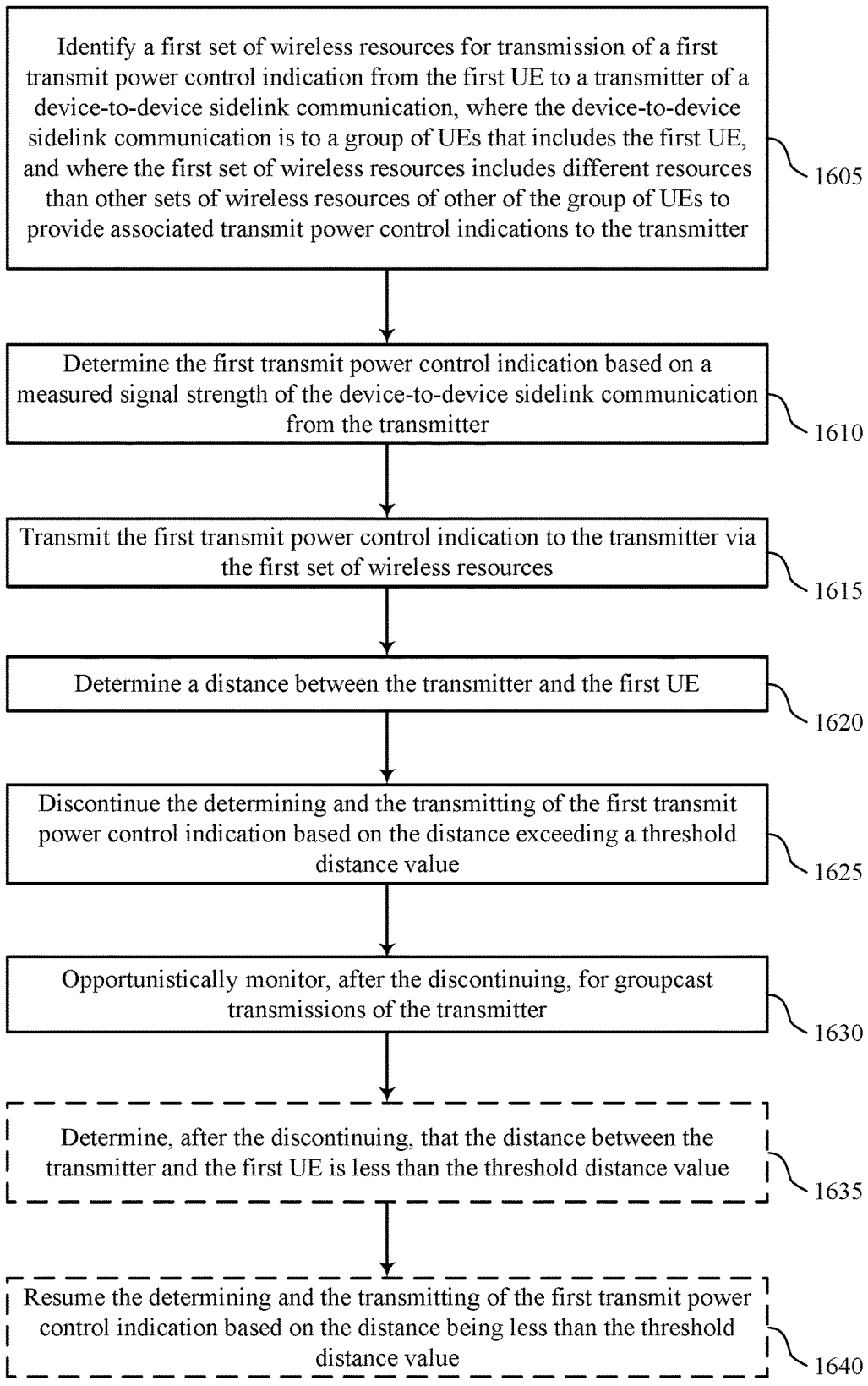

FIG. 16 shows a flowchart illustrating a method 1600 that supports power control indication in groupcast sidelink communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter. The operations of 1605 may be performed according to the methods described herein. In some examples, aspects of the operations of 1605 may be performed by a groupcast resource manager as described with reference to FIGS. 6 through 9.

At 1610, the UE may determine the first transmit power control indication based on a measured signal strength of the device-to-device sidelink communication from the groupcast transmitter. The operations of 1610 may be performed according to the methods described herein. In some examples, aspects of the operations of 1610 may be performed by a TPC manager as described with reference to FIGS. 6 through 9.

At 1615, the UE may transmit the first transmit power control indication to the groupcast transmitter via the first set of wireless resources. The operations of 1615 may be performed according to the methods described herein. In some examples, aspects of the operations of 1615 may be performed by a sidelink transmission manager as described with reference to FIGS. 6 through 9.

At 1620, the UE may determine a distance between the groupcast transmitter and the first UE. The operations of 1620 may be performed according to the methods described herein. In some examples, aspects of the operations of 1620 may be performed by a proximity manager as described with reference to FIGS. 6 through 9.

At 1625, the UE may discontinue the determining and the transmitting of the first transmit power control indication based on the distance exceeding a threshold distance value. The operations of 1625 may be performed according to the methods described herein. In some examples, aspects of the operations of 1625 may be performed by a proximity manager as described with reference to FIGS. 6 through 9.

At 1630, the UE may opportunistically monitor, after the discontinuing, for groupcast transmissions of the groupcast transmitter. The operations of 1630 may be performed according to the methods described herein. In some examples, aspects of the operations of 1630 may be performed by a proximity manager as described with reference to FIGS. 6 through 9.

Optionally, at 1635, the UE may determine, after the discontinuing, that the distance between the groupcast transmitter and the first UE is less than the threshold distance value. The operations of 1635 may be performed according to the methods described herein. In some examples, aspects of the operations of 1635 may be performed by a proximity manager as described with reference to FIGS. 6 through 9.

Optionally, at 1640, the UE may resume the determining and the transmitting of the first transmit power control indication based on the distance being less than the threshold distance value. The operations of 1640 may be performed according to the methods described herein. In some examples, aspects of the operations of 1640 may be performed by a proximity manager as described with reference to FIGS. 6 through 9.

Figure 17:
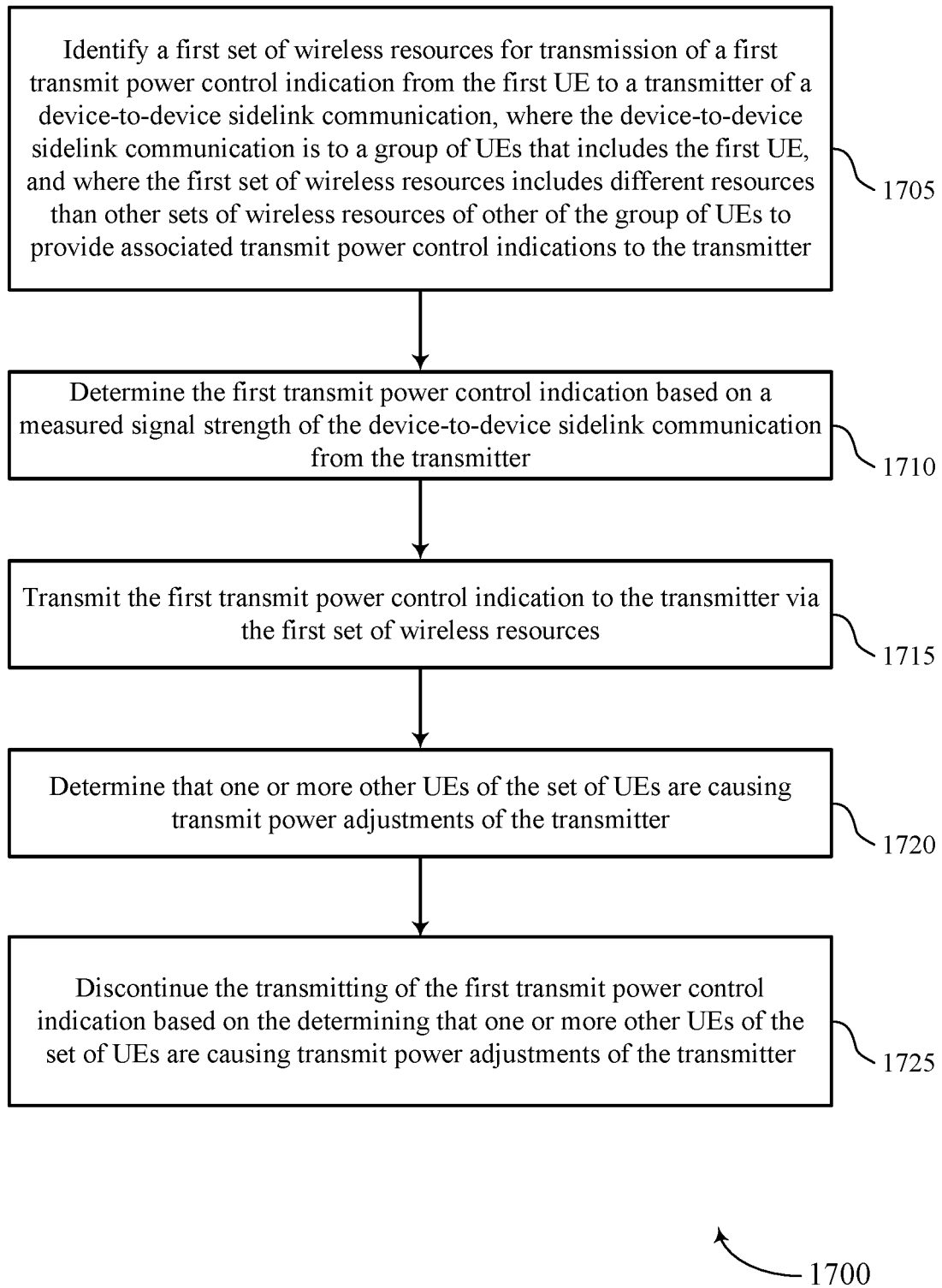

FIG. 17 shows a flowchart illustrating a method 1700 that supports power control indication in groupcast sidelink communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may identify a first set of wireless resources for transmission of a first transmit power control indication from the first UE to a groupcast transmitter of a device-to-device sidelink communication, where the device-to-device sidelink communication is to a group of UEs that includes the first UE, and where the first set of wireless resources includes different resources than other sets of wireless resources of other UEs of the group of UEs to provide associated transmit power control indications to the groupcast transmitter. The operations of 1705 may be performed according to the methods described herein. In some examples, aspects of the operations of 1705 may be performed by a groupcast resource manager as described with reference to FIGS. 6 through 9.

At 1710, the UE may determine the first transmit power control indication based on a measured signal strength of the device-to-device sidelink communication from the groupcast transmitter. The operations of 1710 may be performed according to the methods described herein. In some examples, aspects of the operations of 1710 may be performed by a TPC manager as described with reference to FIGS. 6 through 9.

At 1715, the UE may transmit the first transmit power control indication to the groupcast transmitter via the first set of wireless resources. The operations of 1715 may be performed according to the methods described herein. In some examples, aspects of the operations of 1715 may be performed by a sidelink transmission manager as described with reference to FIGS. 6 through 9.

At 1720, the UE may determine that one or more other UEs of the group of UEs are causing transmit power adjustments of the groupcast transmitter. The operations of 1720 may be performed according to the methods described herein. In some examples, aspects of the operations of 1720 may be performed by a TPC manager as described with reference to FIGS. 6 through 9.

At 1725, the UE may discontinue the transmitting of the first transmit power control indication based on the determining that one or more other UEs of the group of UEs are causing transmit power adjustments of the groupcast transmitter. The operations of 1725 may be performed according to the methods described herein. In some examples, aspects of the operations of 1725 may be performed by a TPC manager as described with reference to FIGS. 6 through 9.

Figure 18:
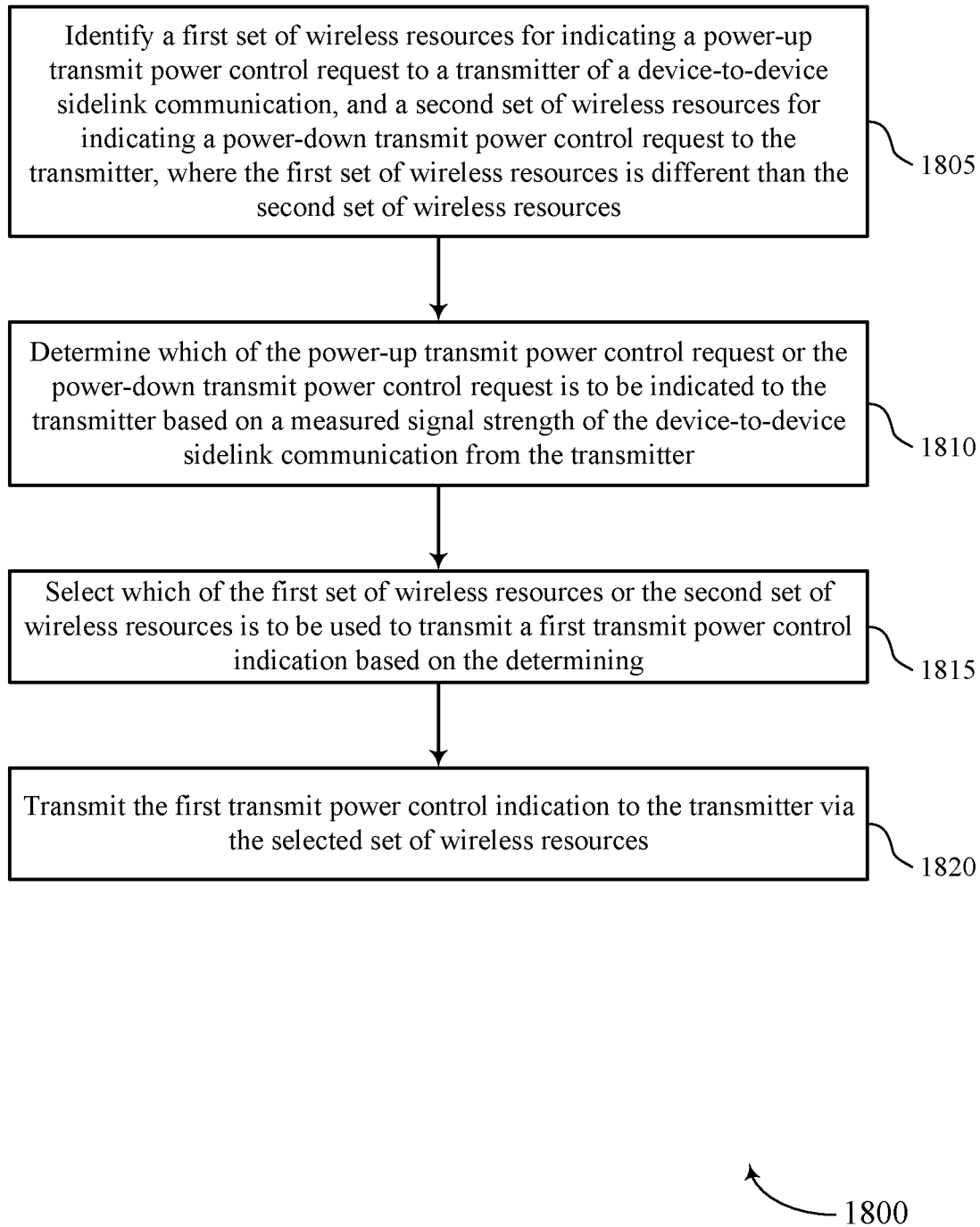

FIG. 18 shows a flowchart illustrating a method 1800 that supports power control indication in groupcast sidelink communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may identify a first set of wireless resources for indicating a power-up transmit power control request to a groupcast transmitter of a device-to-device sidelink communication, and a second set of wireless resources for indicating a power-down transmit power control request to the groupcast transmitter, where the first set of wireless resources is different than the second set of wireless resources. The operations of 1805 may be performed according to the methods described herein. In some examples, aspects of the operations of 1805 may be performed by a groupcast resource manager as described with reference to FIGS. 6 through 9. Additionally or alternatively, means for performing 1805 may, but not necessarily, include, for example, antenna 925, transceiver 920, communications manager 910, memory 930 (including code 935), processor 940 and/or bus 945.

At 1810, the UE may determine which of the power-up transmit power control request or the power-down transmit power control request is to be indicated to the groupcast transmitter based on a measured signal strength of the device-to-device sidelink communication from the groupcast transmitter. The operations of 1810 may be performed according to the methods described herein. In some examples, aspects of the operations of 1810 may be performed by a TPC manager as described with reference to FIGS. 6 through 9. Additionally or alternatively, means for performing 1810 may, but not necessarily, include, for example, communications manager 910, memory 930 (including code 935), processor 940 and/or bus 945.

At 1815, the UE may select which of the first set of wireless resources or the second set of wireless resources is to be used to transmit a first transmit power control indication based on the determining. The operations of 1815 may be performed according to the methods described herein. In some examples, aspects of the operations of 1815 may be performed by a groupcast resource manager as described with reference to FIGS. 6 through 9. Additionally or alternatively, means for performing 1815 may, but not necessarily, include, for example, communications manager 910, memory 930 (including code 935), processor 940 and/or bus 945.

At 1820, the UE may transmit the first transmit power control indication to the groupcast transmitter via the selected set of wireless resources. The operations of 1820 may be performed according to the methods described herein. In some examples, aspects of the operations of 1820 may be performed by a sidelink transmission manager as described with reference to FIGS. 6 through 9. Additionally or alternatively, means for performing 1820 may, but not necessarily, include, for example, antenna 925, transceiver 920, communications manager 910, memory 930 (including code 935), processor 940 and/or bus 945.

Figure 19:
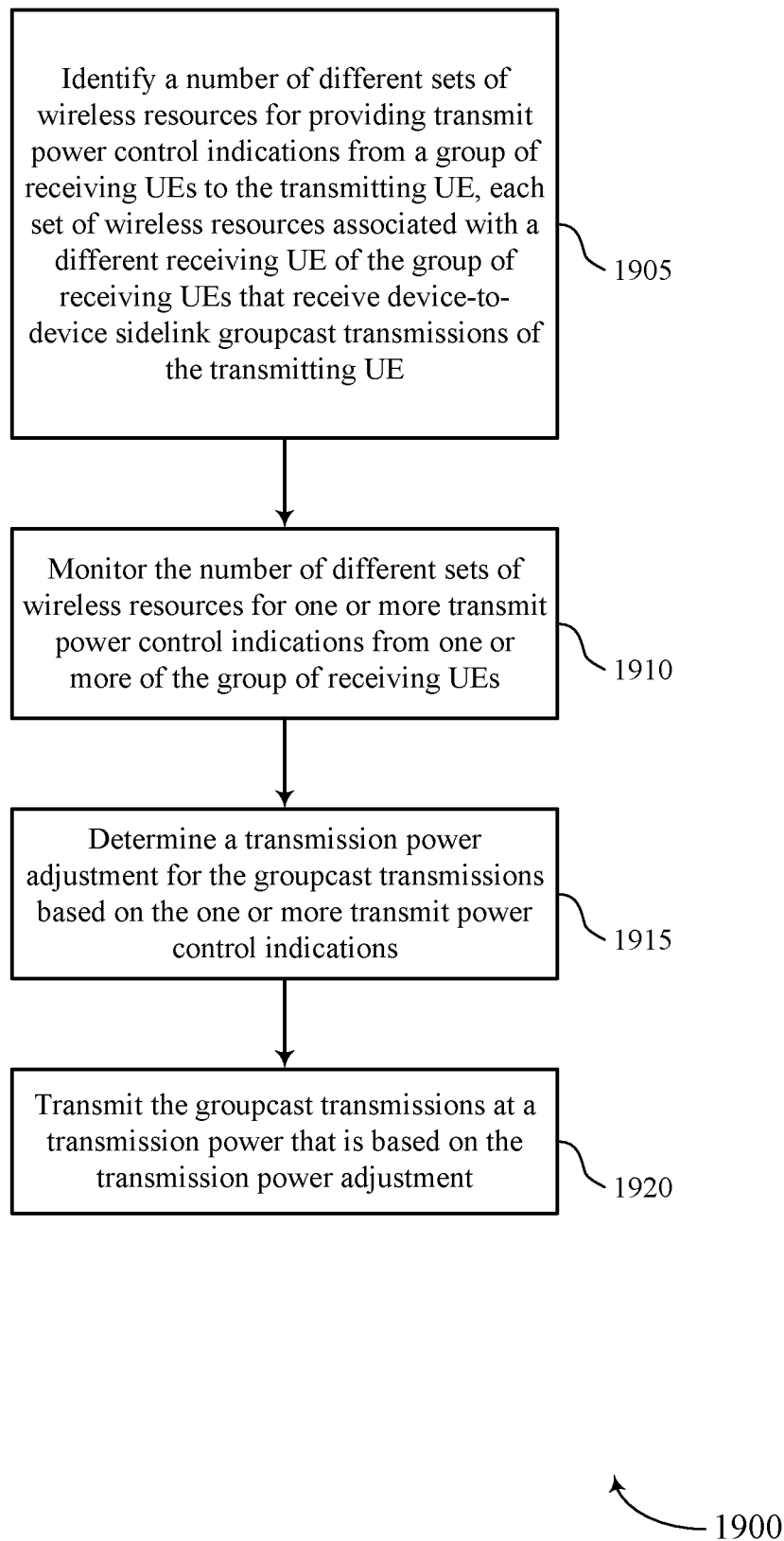

FIG. 19 shows a flowchart illustrating a method 1900 that supports power control indication in groupcast sidelink communications in accordance with aspects of the present disclosure. The operations of method 1900 may be implemented by a UE 115 or base station 105 or its components as described herein. For example, the operations of method 1900 may be performed by a communications manager as described with reference to FIGS. 10 through 14. In some examples, a sidelink UE may execute a set of instructions to control the functional elements of the UE to perform the functions described below. Additionally or alternatively, a UE may perform aspects of the functions described below using special-purpose hardware.

At 1905, the UE may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE. The operations of 1905 may be performed according to the methods described herein. In some examples, aspects of the operations of 1905 may be performed by a groupcast resource manager as described with reference to FIGS. 10 through 14. Additionally or alternatively, means for performing 1905 may, but not necessarily, include, for example, antenna 1325, transceiver 1320, communications manager 1310, memory 1330 (including code 1335), processor 1340 and/or bus 1345.

At 1910, the UE may monitor the number of different sets of wireless resources for one or more transmit power control indications from one or more of the group of receiving UEs. The operations of 1910 may be performed according to the methods described herein. In some examples, aspects of the operations of 1910 may be performed by a TPC manager as described with reference to FIGS. 10 through 14. Additionally or alternatively, means for performing 1910 may, but not necessarily, include, for example, antenna 1325, transceiver 1320, communications manager 1310, memory 1330 (including code 1335), processor 1340 and/or bus 1345.

At 1915, the UE may determine a transmission power adjustment for the groupcast transmissions based on the one or more transmit power control indications. The operations of 1915 may be performed according to the methods described herein. In some examples, aspects of the operations of 1915 may be performed by a TPC manager as described with reference to FIGS. 10 through 14. Additionally or alternatively, means for performing 1915 may, but not necessarily, include, for example, communications manager 1310, memory 1330 (including code 1335), processor 1340 and/or bus 1345.

At 1920, the UE may transmit the groupcast transmissions at a transmission power that is based on the transmission power adjustment. The operations of 1920 may be performed according to the methods described herein. In some examples, aspects of the operations of 1920 may be performed by a sidelink transmission manager as described with reference to FIGS. 10 through 14. Additionally or alternatively, means for performing 1920 may, but not necessarily, include, for example, antenna 1325, transceiver 1320, communications manager 1310, memory 1330 (including code 1335), processor 1340 and/or bus 1345.

Figure 20:
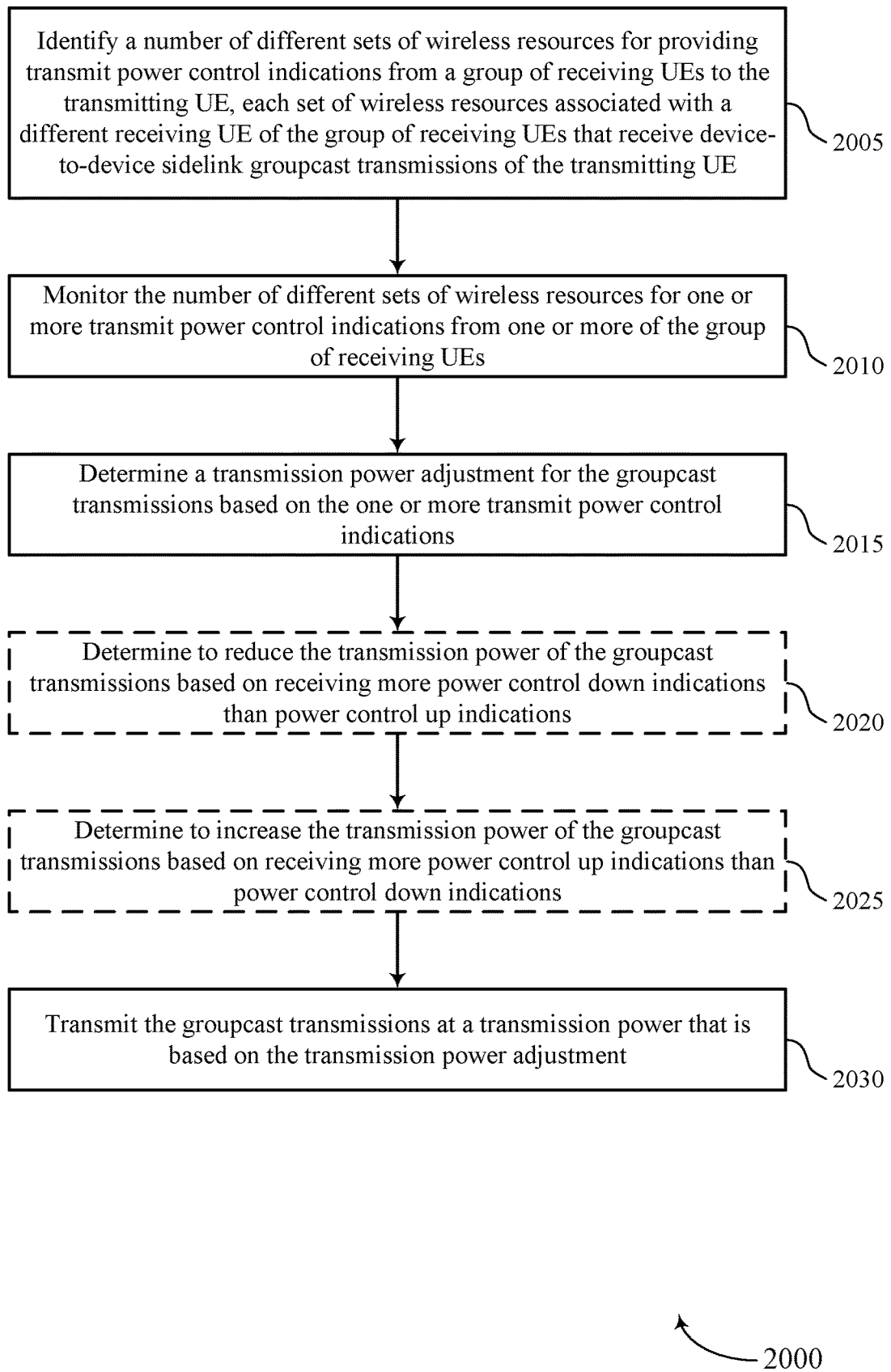

FIG. 20 shows a flowchart illustrating a method 2000 that supports power control indication in groupcast sidelink communications in accordance with aspects of the present disclosure. The operations of method 2000 may be implemented by a UE 115 or base station 105 or its components as described herein. For example, the operations of method 2000 may be performed by a communications manager as described with reference to FIGS. 10 through 14. In some examples, a UE may execute a set of instructions to control the functional elements of the UE to perform the functions described below. Additionally or alternatively, a UE may perform aspects of the functions described below using special-purpose hardware.

At 2005, the UE may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE. The operations of 2005 may be performed according to the methods described herein. In some examples, aspects of the operations of 2005 may be performed by a groupcast resource manager as described with reference to FIGS. 10 through 14.

At 2010, the UE may monitor the number of different sets of wireless resources for one or more transmit power control indications from one or more of the group of receiving UEs. The operations of 2010 may be performed according to the methods described herein. In some examples, aspects of the operations of 2010 may be performed by a TPC manager as described with reference to FIGS. 10 through 14.

At 2015, the UE may determine a transmission power adjustment for the groupcast transmissions based on the one or more transmit power control indications. The operations of 2015 may be performed according to the methods described herein. In some examples, aspects of the operations of 2015 may be performed by a TPC manager as described with reference to FIGS. 10 through 14.

Optionally, at 2020, the UE may determine to reduce the transmission power of the groupcast transmissions based on receiving more power control down indications than power control up indications. The operations of 2020 may be performed according to the methods described herein. In some examples, aspects of the operations of 2020 may be performed by a TPC manager as described with reference to FIGS. 10 through 14.

Optionally, at 2025, the UE may determine to increase the transmission power of the groupcast transmissions based on receiving more power control up indications than power control down indications. The operations of 2025 may be performed according to the methods described herein. In some examples, aspects of the operations of 2025 may be performed by a TPC manager as described with reference to FIGS. 10 through 14.

At 2030, the UE or base station may transmit the groupcast transmissions at a transmission power that is based on the transmission power adjustment. The operations of 2030 may be performed according to the methods described herein. In some examples, aspects of the operations of 2030 may be performed by a sidelink transmission manager as described with reference to FIGS. 10 through 14.

Figure 21:
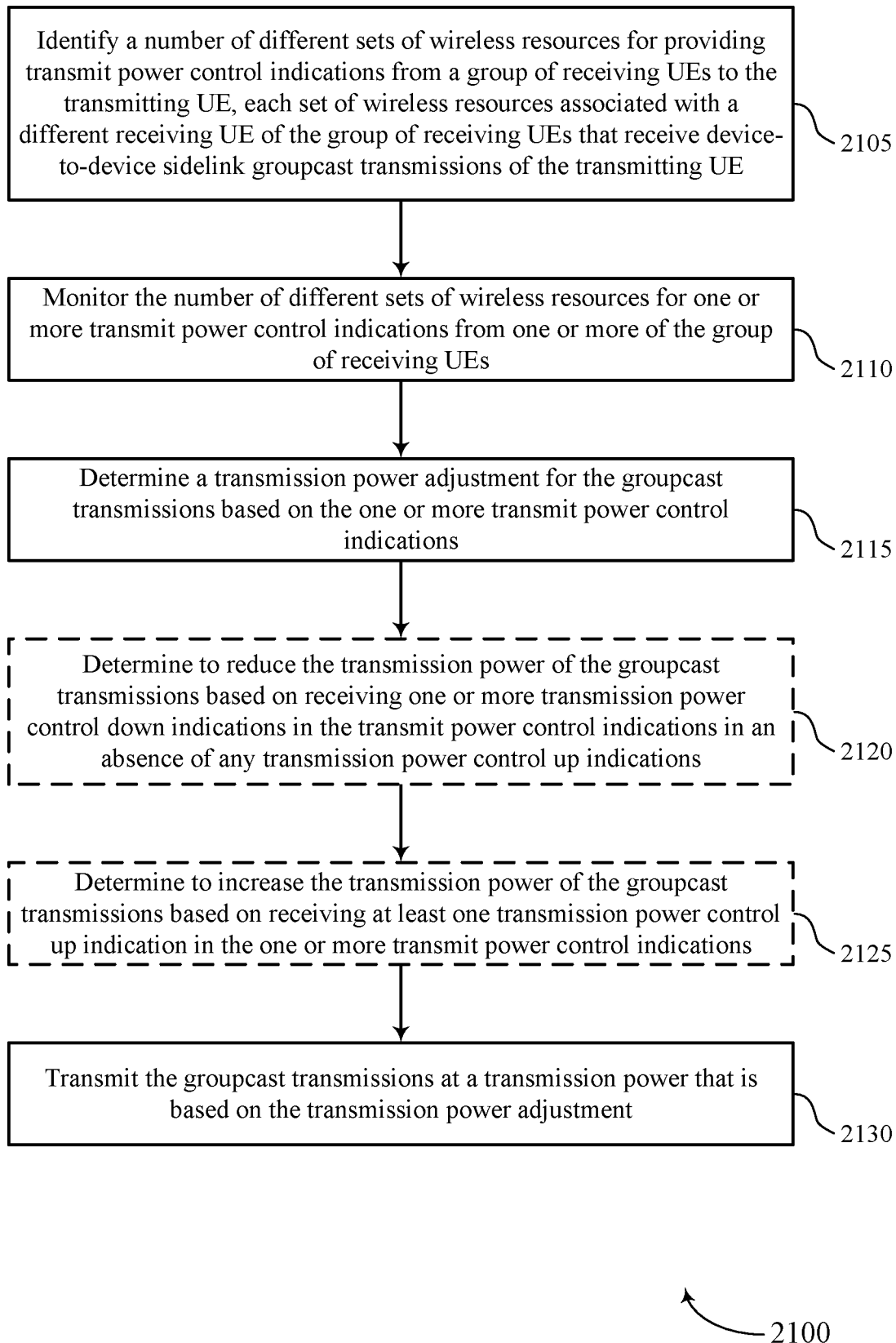

FIG. 21 shows a flowchart illustrating a method 2100 that supports power control indication in groupcast sidelink communications in accordance with aspects of the present disclosure. The operations of method 2100 may be implemented by a UE 115 or base station 105 or its components as described herein. For example, the operations of method 2100 may be performed by a communications manager as described with reference to FIGS. 10 through 14. In some examples, a UE may execute a set of instructions to control the functional elements of the UE to perform the functions described below. Additionally or alternatively, a UE may perform aspects of the functions described below using special-purpose hardware.

At 2105, the UE may identify a number of different sets of wireless resources for providing transmit power control indications from a group of receiving UEs to the groupcast transmitting UE, each set of wireless resources associated with a different receiving UE of the group of receiving UEs that receive device-to-device sidelink groupcast transmissions of the groupcast transmitting UE. The operations of 2105 may be performed according to the methods described herein. In some examples, aspects of the operations of 2105 may be performed by a groupcast resource manager as described with reference to FIGS. 10 through 14.

At 2110, the UE may monitor the number of different sets of wireless resources for one or more transmit power control indications from one or more of the group of receiving UEs. The operations of 2110 may be performed according to the methods described herein. In some examples, aspects of the operations of 2110 may be performed by a TPC manager as described with reference to FIGS. 10 through 14.

At 2115, the UE may determine a transmission power adjustment for the groupcast transmissions based on the one or more transmit power control indications. The operations of 2115 may be performed according to the methods described herein. In some examples, aspects of the operations of 2115 may be performed by a TPC manager as described with reference to FIGS. 10 through 14.

At 2120, the UE may determine to reduce the transmission power of the groupcast transmissions based on receiving one or more transmission power control down indications in the one or more transmit power control indications in an absence of any transmission power control up indications. The operations of 2120 may be performed according to the methods described herein. In some examples, aspects of the operations of 2120 may be performed by a TPC manager as described with reference to FIGS. 10 through 14.

At 2125, the UE may determine to increase the transmission power of the groupcast transmissions based on receiving at least one transmission power control up indication in the one or more transmit power control indications. The operations of 2125 may be performed according to the methods described herein. In some examples, aspects of the operations of 2125 may be performed by a TPC manager as described with reference to FIGS. 10 through 14.

At 2130, the UE may transmit the groupcast transmissions at a transmission power that is based on the transmission power adjustment. The operations of 2130 may be performed according to the methods described herein. In some examples, aspects of the operations of 2130 may be performed by a sidelink transmission manager as described with reference to FIGS. 10 through 14.

Figure 22:
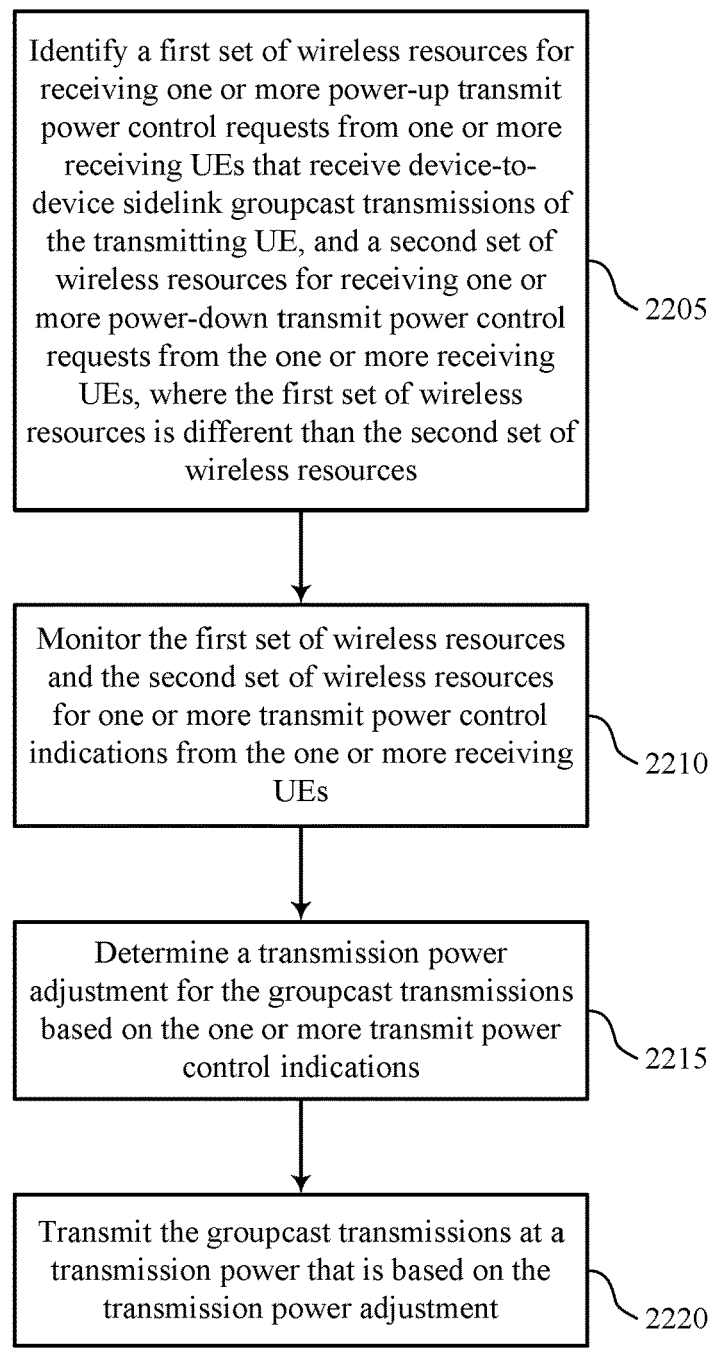

FIG. 22 shows a flowchart illustrating a method 2200 that supports power control indication in groupcast sidelink communications in accordance with aspects of the present disclosure. The operations of method 2200 may be implemented by a UE 115 or base station 105 or its components as described herein. For example, the operations of method 2200 may be performed by a communications manager as described with reference to FIGS. 10 through 14. In some examples, a UE may execute a set of instructions to control the functional elements of the UE to perform the functions described below. Additionally or alternatively, a UE may perform aspects of the functions described below using special-purpose hardware.

At 2205, the UE may identify a first set of wireless resources for receiving one or more power-up transmit power control requests from one or more receiving UEs that receive device-to-device sidelink groupcast transmissions of the groupcast transmitting UE, and a second set of wireless resources for receiving one or more power-down transmit power control requests from the one or more receiving UEs, where the first set of wireless resources is different than the second set of wireless resources. The operations of 2205 may be performed according to the methods described herein. In some examples, aspects of the operations of 2205 may be performed by a groupcast resource manager as described with reference to FIGS. 10 through 14. Additionally or alternatively, means for performing 2205 may, but not necessarily, include, for example, antenna 1325, transceiver 1320, communications manager 1310, memory 1330 (including code 1335), processor 1340 and/or bus 1345.

At 2210, the UE may monitor the first set of wireless resources and the second set of wireless resources for one or more transmit power control indications from the one or more receiving UEs. The operations of 2210 may be performed according to the methods described herein. In some examples, aspects of the operations of 2210 may be performed by a TPC manager as described with reference to FIGS. 10 through 14. Additionally or alternatively, means for performing 2210 may, but not necessarily, include, for example, antenna 1325, transceiver 1320, communications manager 1310, memory 1330 (including code 1335), processor 1340 and/or bus 1345.

At 2215, the UE may determine a transmission power adjustment for the groupcast transmissions based on the one or more transmit power control indications. The operations of 2215 may be performed according to the methods described herein. In some examples, aspects of the operations of 2215 may be performed by a TPC manager as described with reference to FIGS. 10 through 14. Additionally or alternatively, means for performing 2215 may, but not necessarily, include, for example, communications manager 1310, memory 1330 (including code 1335), processor 1340 and/or bus 1345.

At 2220, the UE may transmit the groupcast transmissions at a transmission power that is based on the transmission power adjustment. The operations of 2220 may be performed according to the methods described herein. In some examples, aspects of the operations of 2220 may be performed by a sidelink transmission manager as described with reference to FIGS. 10 through 14. Additionally or alternatively, means for performing 2220 may, but not necessarily, include, for example, antenna 1325, transceiver 1320, communications manager 1310, memory 1330 (including code 1335), processor 1340 and/or bus 1345.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-ji), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:

identifying a first set of sidelink wireless resources for transmission of a first transmit power control indication from the first UE to a transmitter of a device-to-device sidelink communication, wherein the device-to-device sidelink communication is to a group of UEs that includes the first UE, and wherein the first set of sidelink wireless resources includes different resources than other sets of sidelink wireless resources of other UEs of the group of UEs to provide associated transmit power control indications to the transmitter;

determining the first transmit power control indication based at least in part on a measured signal strength of at least one device-to-device sidelink communication from the transmitter, wherein determining the first transmit power control indication is performed responsive to a physical sidelink shared channel transmission being received from the transmitter; and transmitting the first transmit power control indication to the transmitter via the first set of sidelink wireless resources.

2. The method of claim 1, wherein the identifying comprises:
receiving an indication of the first set of sidelink wireless resources from one or more of a network access node that serves the transmitter and the first UE, the transmitter, another UE of the group of UEs, or any combinations thereof.

3. The method of claim 1, further comprising:
determining, prior to identifying the first set of sidelink wireless resources, to subscribe to groupcast transmissions of the transmitter, and wherein the identifying the first set of sidelink wireless resources is performed responsive to subscribing to the groupcast transmissions of the transmitter.

4. The method of claim 1, further comprising:
determining a distance between the transmitter and the first UE; and
discontinuing the determining and the transmitting of the first transmit power control indication based at least in part on the distance exceeding a threshold distance value.

5. The method of claim 4, further comprising:
opportunistically monitoring, after the discontinuing, for groupcast transmissions of the transmitter.

6. The method of claim 4, further comprising:
determining, after the discontinuing, that the distance between the transmitter and the first UE is less than the threshold distance value; and
resuming the determining and the transmitting of the first transmit power control indication based at least in part on the distance being less than the threshold distance value.

7. The method of claim 1, wherein the first set of sidelink wireless resources is associated with a first beam of a set of beams used by the transmitter for groupcast communications.

8. The method of claim 1, wherein the transmitter communicates using an omnidirectional beam, and wherein the first set of sidelink wireless resources comprises a first set of time resources, a first set of frequency resources, or combinations thereof.

9. The method of claim 1, further comprising:
determining that one or more other UEs of the group of UEs are causing transmit power adjustments of the transmitter; and
discontinuing the transmitting of the first transmit power control indication based at least in part on the determining that one or more other UEs of the group of UEs are causing transmit power adjustments of the transmitter.

10. The method of claim 9, wherein the determining that the one or more other UEs of the group of UEs are causing transmit power adjustments of the transmitter comprises:
transmitting one or more power down indications to the transmitter; and
determining that the transmitter has maintained or increased transmission power after the one or more power down indications.

11. The method of claim 1, further comprising:
setting a transmit power of the first transmit power control indication at a maximum transmission power of the first UE based on the first transmit power control indication requesting a higher transmit power at the transmitter.

12. The method of claim 1, further comprising:
determining that a lower transmit power at the transmitter is to be requested by the first UE; and setting a transmit power of the first transmit power control indication according to an open loop power control procedure or according to a preconfigured transmit power responsive to the determining that the lower transmit power is requested.

13. A method for wireless communication at a transmitting user equipment (UE), comprising:
identifying a plurality of different sets of sidelink wireless resources for providing transmit power control indications from a group of receiving UEs to the transmitting UE, each set of sidelink wireless resources associated with a different receiving UE of the group of receiving UEs that receive device-to-device sidelink groupcast transmissions of the transmitting UE, wherein the transmit power control indications are provided responsive to a physical sidelink shared channel transmission being received from the transmitting UE;
monitoring the plurality of different sets of sidelink wireless resources for one or more transmit power control indications from one or more of the group of receiving UEs;
determining a transmission power adjustment for the groupcast transmissions based at least in part on the one or more transmit power control indications; and
transmitting the groupcast transmissions at a transmission power that is based at least in part on the transmission power adjustment.

14. The method of claim 13, wherein the identifying comprises:
receiving an indication of the plurality of different sets of sidelink wireless resources from one or more of a network access node that serves the transmitting UE, another UE of the group of UEs, or any combinations thereof.

15. The method of claim 13, wherein the determining the transmission power adjustment comprises:
determining to reduce the transmission power of the groupcast transmissions based on receiving more power control down indications than power control up indications; and
determining to increase the transmission power of the groupcast transmissions based on receiving more power control up indications than power control down indications.

16. The method of claim 13, wherein the determining the transmission power adjustment comprises:
determining to reduce the transmission power of the groupcast transmissions based on receiving one or more transmission power control down indications in the one or more transmit power control indications in an absence of any transmission power control up indications; and
determining to increase the transmission power of the groupcast transmissions based on receiving at least one transmission power control up indication in the one or more transmit power control indications.

17. The method of claim 13, wherein the groupcast transmissions are transmitted using an omnidirectional beam, and wherein the plurality of different sets of sidelink wireless resources comprise different sets of time resources, frequency resources, or combinations thereof.

18. The method of claim 13, wherein the determining the transmission power adjustment comprises:
determining to reduce the transmission power a first beam used for the groupcast transmissions based on receiving one or more transmission power control down indica-
tions in the one or more transmit power control indications associated with the first beam in an absence of any transmission power control up indications associated with the first beam; and determining to increase the transmission power of the first beam used for the groupcast transmissions based on receiving at least one transmission power control up indication associated with the first beam.

19. An apparatus for wireless communication at a first user equipment (UE), comprising:
a processor,
memory coupled with the processor; and
instructions stored in the memory and executable by the processor to cause the apparatus to:
identify a first set of sidelink wireless resources for transmission of a first transmit power control indication from the first UE to a transmitter of a device-to-device sidelink communication, wherein the device-to-device sidelink communication is to a group of UEs that includes the first UE, and wherein the first set of sidelink wireless resources includes different resources than other sets of sidelink wireless resources of other UEs of the group of UEs to provide associated transmit power control indications to the transmitter;
determine the first transmit power control indication based at least in part on a measured signal strength of the device-to-device sidelink communication from the transmitter, wherein determining the first transmit power control indication is performed responsive to a physical sidelink shared channel transmission being received from the transmitter; and
transmit the first transmit power control indication to the transmitter via the first set of sidelink wireless resources.

20. The apparatus of claim 19, wherein the instructions are further executable by the processor to cause the apparatus to:
determine, prior to identifying the first set of sidelink wireless resources, to subscribe to groupcast transmissions of the transmitter, and wherein the identifying the first set of sidelink wireless resources is performed responsive to subscribing to the groupcast transmissions of the transmitter.

21. The apparatus of claim 19, wherein the instructions are further executable by the processor to cause the apparatus to:
determine a distance between the transmitter and the first UE; and
discontinue the determining and the transmitting of the first transmit power control indication based at least in part on the distance exceeding a threshold distance value.

22. The apparatus of claim 19, wherein the instructions are further executable by the processor to cause the apparatus to:
determine that one or more other UEs of the group of UEs are causing transmit power adjustments of the transmitter; and
discontinue the transmitting of the first transmit power control indication based at least in part on the determining that one or more other UEs of the group of UEs are causing transmit power adjustments of the transmitter.

23. The apparatus of claim 19, wherein the instructions are further executable by the processor to cause the apparatus to:

set a transmit power of the first transmit power control indication at a maximum transmission power of the first UE based on the first transmit power control indication requesting a higher transmit power at the transmitter.

24. The apparatus of claim 19, wherein the instructions are further executable by the processor to cause the apparatus to:
determine that a lower transmit power at the transmitter is to be requested by the first UE; and
set a transmit power of the first transmit power control indication according to an open loop power control procedure or according to a preconfigured transmit power responsive to the determining that the lower transmit power is requested.

25. An apparatus for wireless communication at a transmitting user equipment (UE), comprising:
a processor,
memory coupled with the processor; and
instructions stored in the memory and executable by the processor to cause the apparatus to:
identify a plurality of different sets of sidelink wireless resources for providing transmit power control indications from a group of receiving UEs to the transmitting UE, each set of wireless resources associated with a different receiving UE of the group of receiving UEs that receive device-to-device sidelink groupcast transmissions of the transmitting UE, wherein the transmit power control indications are provided responsive to a physical sidelink shared channel transmission being received from the transmitting UE;
monitor the plurality of different sets of sidelink wireless resources for one or more transmit power control indications from one or more of the group of receiving UEs;
determine a transmission power adjustment for the groupcast transmissions based at least in part on the one or more transmit power control indications; and
transmit the groupcast transmissions at a transmission power that is based at least in part on the transmission power adjustment.

26. The apparatus of claim 25, wherein the instructions are further executable by the processor to cause the apparatus to:
determine to reduce the transmission power of the groupcast transmissions based on receiving more power control down indications than power control up indications; and
determine to increase the transmission power of the groupcast transmissions based on receiving more power control up indications than power control down indications.

27. The apparatus of claim 25, wherein the instructions are further executable by the processor to cause the apparatus to:
determine to reduce the transmission power of the groupcast transmissions based on receiving one or more transmission power control down indications in the one or more transmit power control indications in an absence of any transmission power control up indications; and
determine to increase the transmission power of the groupcast transmissions based on receiving at least one transmission power control up indication in the one or more transmit power control indications.

28. The apparatus of claim 25, wherein the instructions are further executable by the processor to cause the apparatus to:

determine to reduce the transmission power a first beam used for the groupcast transmissions based on receiving one or more transmission power control down indications in the one or more transmit power control indications associated with the first beam in an absence of any transmission power control up indications associated with the first beam; and determine to increase the transmission power of the first beam used for the groupcast transmissions based on receiving at least one transmission power control up indication associated with the first beam.

\* \* \* \* \*